United States Patent
Makii et al.

(10) Patent No.: US 7,602,439 B2
(45) Date of Patent: Oct. 13, 2009

(54) LENS UNIT AND IMAGING APPARATUS

(75) Inventors: Tatsuo Makii, Tokyo (JP); Motoshige Ito, Kanagawa (JP); Hideo Okamoto, Tokyo (JP); Takeshi Takizawa, Kanagawa (JP); Takatoshi Uneme, Tokyo (JP); Keishi Iwana, Tokyo (JP); Satoshi Imai, Kanagawa (JP); Fujio Kanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 11/351,113

(22) Filed: Feb. 10, 2006

(65) Prior Publication Data
US 2006/0181632 A1    Aug. 17, 2006

(30) Foreign Application Priority Data

Feb. 15, 2005  (JP) ............................. 2005-037971
Mar. 9, 2005  (JP) ............................. 2005-065933

(51) Int. Cl.
*H04N 5/225*    (2006.01)
(52) U.S. Cl. ....................................... 348/374
(58) Field of Classification Search .................. 348/374
See application file for complete search history.

(56) References Cited

U.S. PATENT DOCUMENTS

| | | | |
|---|---|---|---|
| 4,658,390 A | | 4/1987 | Fujii et al. |
| 5,079,582 A | * | 1/1992 | Hamada et al. ............. 396/133 |
| 5,138,497 A | | 8/1992 | Blanding |
| 5,289,318 A | * | 2/1994 | Sekine et al. ................ 359/813 |
| 5,467,328 A | | 11/1995 | Murakami et al. |
| 5,777,806 A | * | 7/1998 | Ikegame et al. ............. 359/823 |
| 2003/0002176 A1 | | 1/2003 | Jang |
| 2004/0145976 A1 | * | 7/2004 | Tanaka et al. ............. 369/44.32 |
| 2005/0254806 A1 | * | 11/2005 | Noguchi ....................... 396/55 |

FOREIGN PATENT DOCUMENTS

CN    1627172 A    6/2005
EP    0 757 269 A1    2/1997

(Continued)

OTHER PUBLICATIONS

Japanese Office Action issued Jul. 17, 2008 for corresponding Japanese Application No. 2005-037971.

(Continued)

*Primary Examiner*—James M Hannett
(74) *Attorney, Agent, or Firm*—Rader, Fishman & Grauer PLLC; Christopher M. Tobin

(57) ABSTRACT

A lens unit includes: a lens barrel; a movable section including a movable lens and configured to be moved in an optical axis direction relative to the lens barrel; a linear actuator including a drive magnet and a drive coil and configured to move the movable section in the optical axis direction by supplying a current to the drive coil; and a pair of biasing blade springs including holding portions for holding the movable section, a plurality of spring portions biasing the movable section in the optical axis direction, and attachment portions to be attached to the lens barrel. One of the biasing blade springs is formed with two spring members through which the current is supplied to the drive coil.

28 Claims, 25 Drawing Sheets

FOREIGN PATENT DOCUMENTS

| | | | |
|---|---|---|---|
| JP | 61240230 A | * | 10/1986 |
| JP | 04-086729 | | 3/1992 |
| JP | 05-034562 | | 2/1993 |
| JP | 3387173 | | 5/1995 |
| JP | 08-015593 | | 1/1996 |
| JP | 09-043474 | | 2/1997 |
| JP | 09259453 A | * | 10/1997 |
| JP | 10-301013 | | 11/1998 |
| JP | 2000-115456 | | 4/2000 |
| JP | 2001-067697 | | 3/2001 |
| JP | 2003-295033 | | 10/2003 |
| JP | 2004-138992 | | 5/2004 |
| JP | 2004-280031 | | 10/2004 |
| JP | 2004-304605 | | 10/2004 |
| JP | 2006-050694 | | 2/2006 |
| WO | WO-2006/054535 | | 5/2006 |

OTHER PUBLICATIONS

Japanese Office Action issued Jul. 3, 2008 for corresponding Japanese Application No. 2005-065933.

European Search Report; Application No./Patent No. 06101705.9-2216; dated Oct. 4, 2006.

Chinese Office Action dated May 11, 2007 for corresponding Chinese Application No. 200610004692.2.

Chinese Office Action dated Jan. 16, 2009 for corresponding Chinese Application No. 200610004692.2.

* cited by examiner

FIG.2
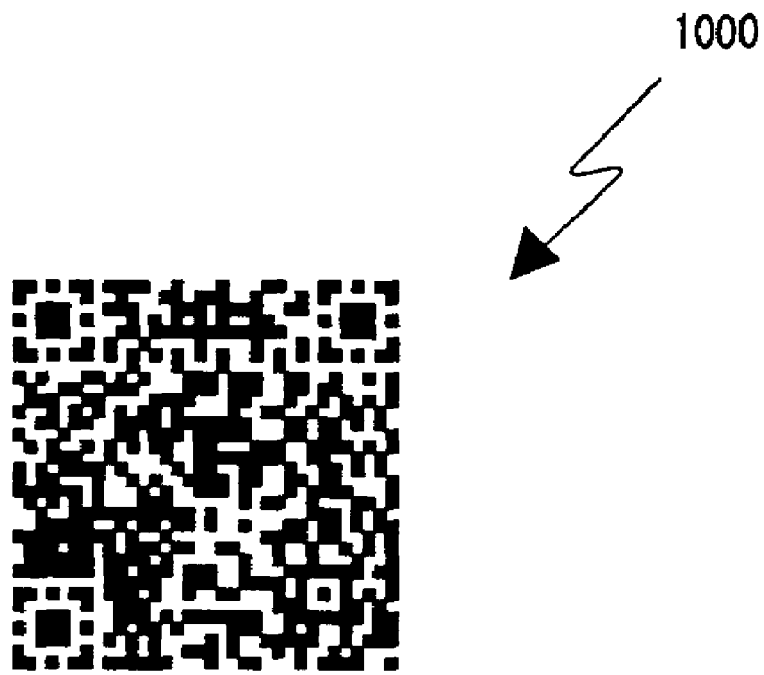
1000
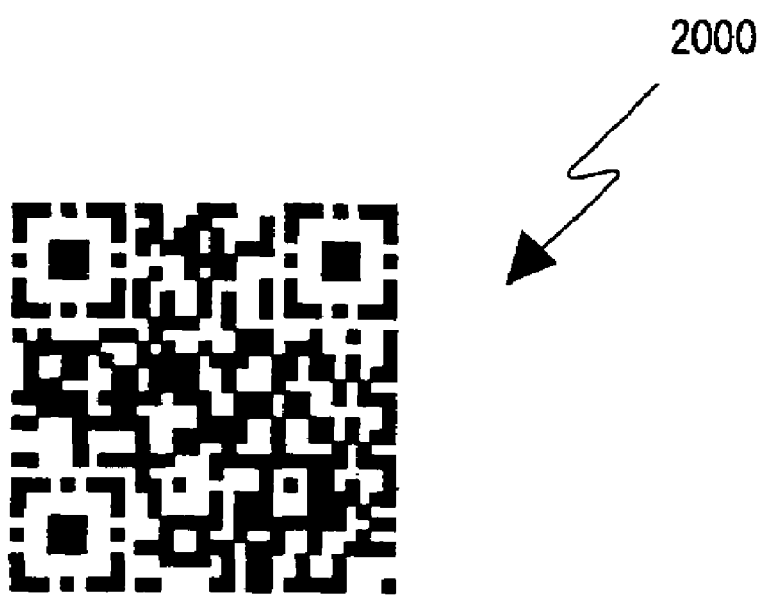
2000

$$P1-P2=Ps>Gt=G1+G2+G3$$

LENS UNIT AND IMAGING APPARATUS

BACKGROUND OF THE INVENTION

1. Field of the Invention

The present invention relates to a lens unit and an imaging apparatus. More specifically, the present invention relates to a lens unit having a movable section and an imaging apparatus including such a lens unit, which allows to improvement in positioning accuracy during movement of the movable section in an optical axis direction and simplification mechanism therein.

2. Description of the Related Art

A lens unit, which is constructed by disposing an imaging optical system, such as a movable lens in a lens barrel, is included in various types of imaging apparatuses, such as a video camera and a still camera as well as a mobile phone, etc. An example of such an imaging apparatus is one that is equipped with a movable section having a movable lens for zooming or focusing, in which the movable section can be moved by a linear actuator in the optical axis direction (for example, see Japanese Patent 3387173 and Japanese Patent Application Publication H08-015593).

In such an imaging apparatus, the movable section is supported by a pair of guide shafts, to be movable in the optical axis direction. The movable section is guided by the pair of guide shafts and moved in the optical axis direction by way of the drive power of the linear actuator.

SUMMARY OF THE INVENTION

However, when moving the movable section by means of the guide shafts as in the above-mentioned imaging apparatus, a clearance of several microns for moving the movable section smoothly with respect to the guide shafts is formed between the guide shaft and a bearing section provided for the movable section. The clearance may allow some movement of the movable section within a plane perpendicular to the optical axis direction and/or inclination of the movable section to the optical axis. Such movement and inclination of the movable section may deteriorate the quality of captured images.

Such an imaging apparatus, as mentioned above, is often used as a portable device. In this case, there is a possibility that a position of the movable section may deviate because of changes in its orientation especially when in use. Due to the deviation in position, an image focal point may shift and a so-called image shake phenomenon may occur in which an image on an image focal plane slightly shakes. This may further worsen the quality of captured images.

Furthermore, in order to move the movable section in the optical axis direction by means of a linear actuator having a magnet and a drive coil, it is necessary to provide a channel for supplying a current to the drive coil.

However, in the previous imaging apparatus, there is the guide mechanism including the guide shaft for guiding the movable section. Accordingly, it is necessary to carry out wiring to the drive coil so as not to interfere with the guide mechanism, thus making the wiring difficult to carry out.

Furthermore, the wiring to the drive coil tends to be complicated. Accordingly, such wiring process adds additional complicating factors that need to be considered in the mechanical structure and assembling procedure of a lens unit and an imaging apparatus.

Accordingly, it is desirable to provide a lens unit and/or an imaging apparatus including such a lens unit, which allows an improvement in the accuracy of the positioning of a movable section when it is moved in an optical axis direction and/or simplification of the mechanism thereof. The present invention is conceived in view of the above-described technical issues.

According to an embodiment of the present invention, there is provided a lens unit and/or an imaging apparatus including such a lens unit. The lens unit includes: a lens barrel in which an imaging optical system is disposed; a movable section including a movable lens and configured to be moved in an optical axis direction relative to the lens barrel; a linear actuator including a drive magnet and a drive coil and configured to move the movable section in the optical axis direction by supplying a current to the drive coil; and a pair of biasing blade springs including holding portions for holding the movable section, a plurality of spring portions capable of being elastically deformed and biasing the movable section in the optical axis direction, and attachment portions to be attached to the lens barrel. One of the pair of biasing blade springs is formed with two spring members. Current is supplied to the drive coil via the two spring members.

In another embodiment of the present invention, the two spring members may be respectively provided with coil connecting portions to be connected to both ends of the drive coil and connecting terminal portions for supplying a current to the drive coil.

In another embodiment of the present invention, a positioning hole may be formed in an attachment portion of the spring member; and the lens barrel may be provided with a positioning pin to be inserted into the positioning hole of the spring member so as to position the spring member with respect to the lens barrel.

In another embodiment of the present invention, the two spring members may be arranged symmetrically about the optical axis.

In another embodiment of the present invention, the lens unit may further include a coil holder to which the drive coil and the two spring members are attached; and a lens holder in which the movable lens is mounted and held. The lens holder in which the movable lens is mounted may be attached to the coil holder, the drive coil and the two spring members attached to the coil holder, both ends of the drive coil and the coil connecting portions are respectively connected by solder.

In the lens unit and the imaging apparatus in accordance with the present invention, the movable section is moved in the optical axis direction while it is held by the pair of biasing blade springs, and one of the biasing blade springs additionally functions as a means for supplying a current to the drive coil.

Accordingly, there is no need to have a dedicated means for supplying a current to the drive coil, thereby achieving a reduction of the number of components in the lens unit.

In another embodiment of the present invention, the plurality of spring portions of the biasing blade spring may be configured to restrain a movement force produced at the movable section in a plane orthogonal to the optical axis.

In another embodiment of the present invention, the movable section may be formed to have a substantially circular outer shape when viewed along the optical axis direction; the lens barrel may be formed to have a substantially rectangular outer shape when viewed along the optical axis direction; and each of the spring portions of the biasing blade spring may be disposed at a respective one of four corners in the lens barrel.

In another embodiment of the present invention, each of the spring portions may be formed into a form substantially equal to the letter "S".

In another embodiment of the present invention, a pair of the biasing blade springs may be provided on opposite sides of the movable section in the optical axis direction and spaced apart such that the movable section is positioned between the pair of biasing blade springs, with the pair of biasing blade springs forcing the movable section such that the pair of the biasing blade springs approach each other in the optical axis direction.

In another embodiment of the present invention, the spring portions of the pair of biasing blade springs may be provided with line portions respectively extending in predetermined directions; and the pair of the biasing blade springs may be configured such that the line portion of one biasing blade spring and the line portion of the other biasing blade spring are perpendicular to each other.

In another embodiment of the present invention, the movable section may be used as a movable section for focusing, the pair of biasing blade springs may be configured to have different spring forces against the movable section; and the movable section may be positioned at an infinite point by way of a biasing force of the biasing blade spring if the linear actuator is not in operation.

BRIEF DESCRIPTION OF THE DRAWINGS

FIG. 2 is an enlarged plan view showing examples of two-dimensional bar codes;

DETAILED DESCRIPTION OF EMBODIMENTS

Below, embodiments of the present invention will be described with reference to the accompanying drawings.

The present invention is applicable to various types of imaging apparatuses, such as a mobile phone, a video camera, a still camera, etc., which have a function of capturing a video or a still image, or to various types of lens units used for these imaging apparatuses.

Figure 1:
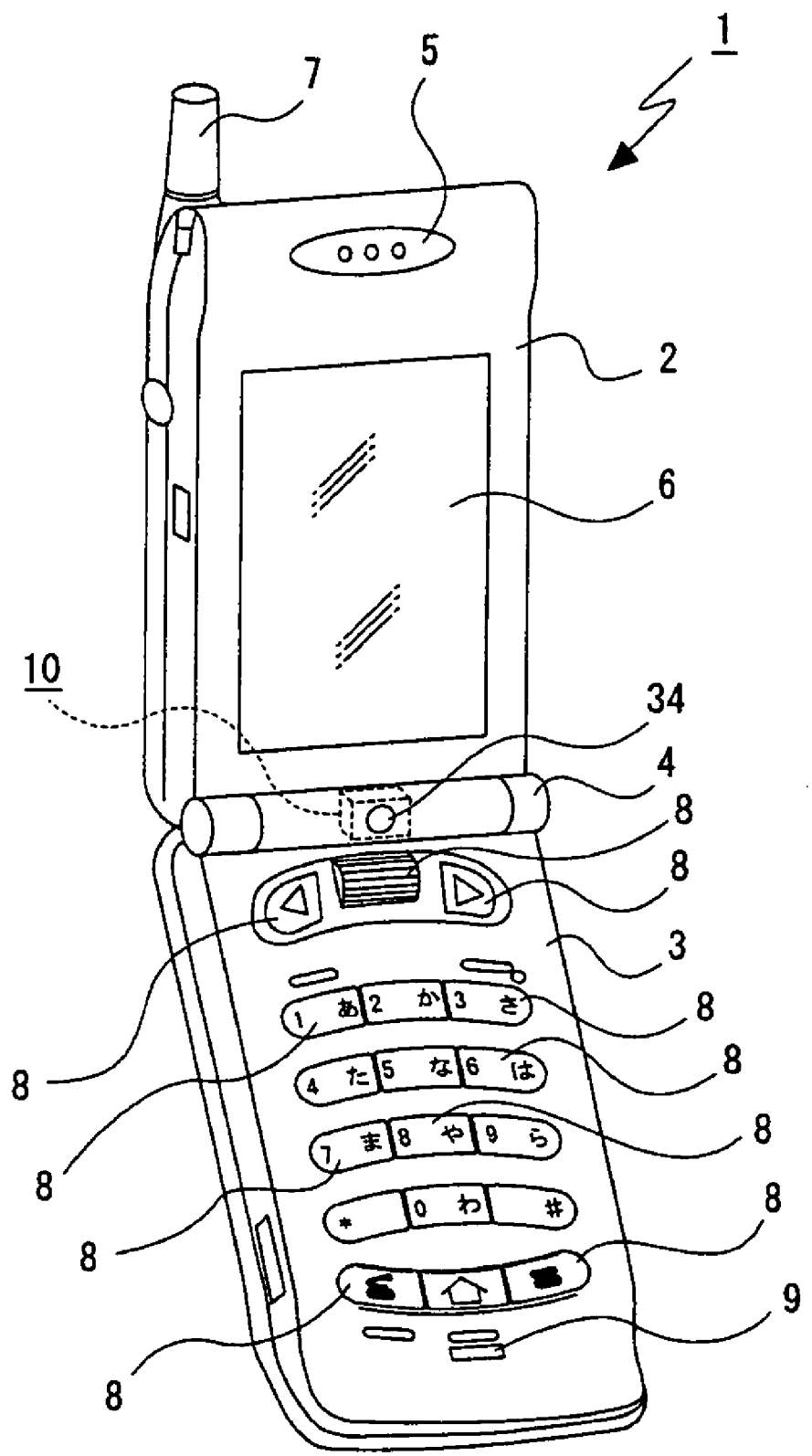
FIG. 1 shows an embodiment in accordance with the present invention in conjunction with FIG. 2 through FIG. 27, and is a perspective view showing a mobile phone as an example of an imaging apparatus.

As an example of an imaging apparatus 1, there is provided a mobile phone as shown in FIG. 1. The imaging apparatus 1 is such that a first casing 2 and a second casing 3 are combined to form a foldable structure in conjunction with a hinge section 4.

The first casing 2 is provided with a speaker 5, a display section 6, and an antenna 7. This antenna 7 is configured to be extendable.

The second casing 3 is provided with various types of operating units 8, including a push button, a rotary dial, a microphone 9 and the like.

An imaging unit 10 is built into the hinge section 4. One of the operating units 8, for example, a push button, may be preset to function for an image capture operation. By pressing and operating this operating unit 8, the imaging unit 10 is operated to capture an image.

The imaging apparatus 1 also has a function to read out and identify information, such as various types of identification displays, which may include a one-dimensional bar code, two-dimensional bar codes 1000 and 2000 (see FIG. 2), etc. When images of these bar codes are captured by the imaging unit 10, the code patterns are identified and information based on the identified code pattern is read out.

Figure 3:
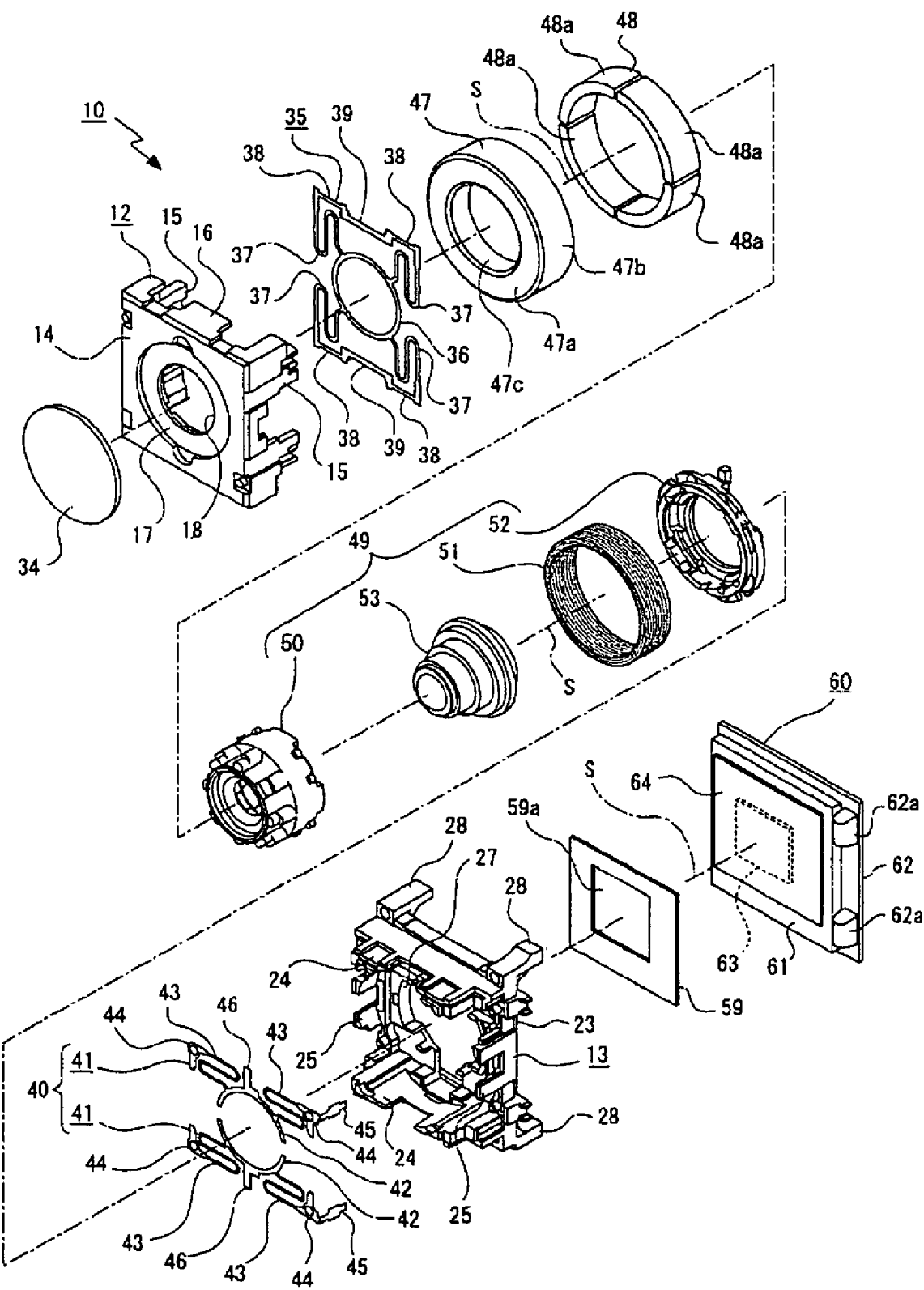
FIG. 3 is an exploded perspective view of an imaging unit.

Next, an example of a structure of the imaging unit 10 is described. It should be noted that, for convenience, the description will be carried out assuming that the optical axis direction (identified by S as shown in FIG. 3) is the forward/rearward direction and an object to be imaged is in the front side.

The imaging unit 10 is configured such that respective constituting portions are disposed in a lens barrel 11, which is formed by a lens unit 10a and an imaging section including an imager device (described later). The lens barrel 11 is configured such that a first member 12 and a second member 13 are sequentially combined (see FIG. 3 through FIG. 6). The first member 12 and the second member 13 are formed of a resin material, such as polycarbonate, etc.

Figure 7:
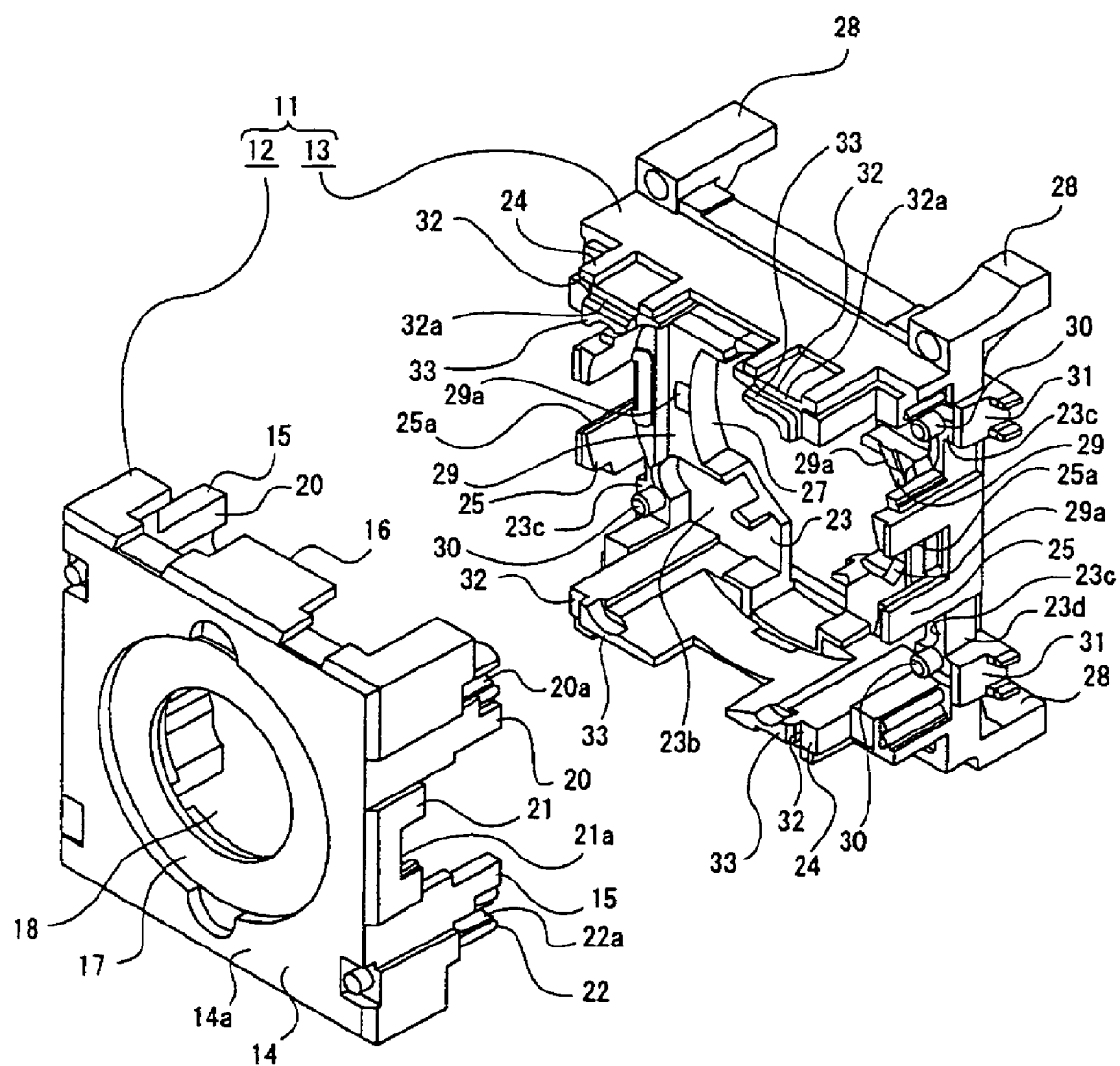
FIG. 7 is an enlarged and exploded perspective view of a lens barrel.
Figure 8:
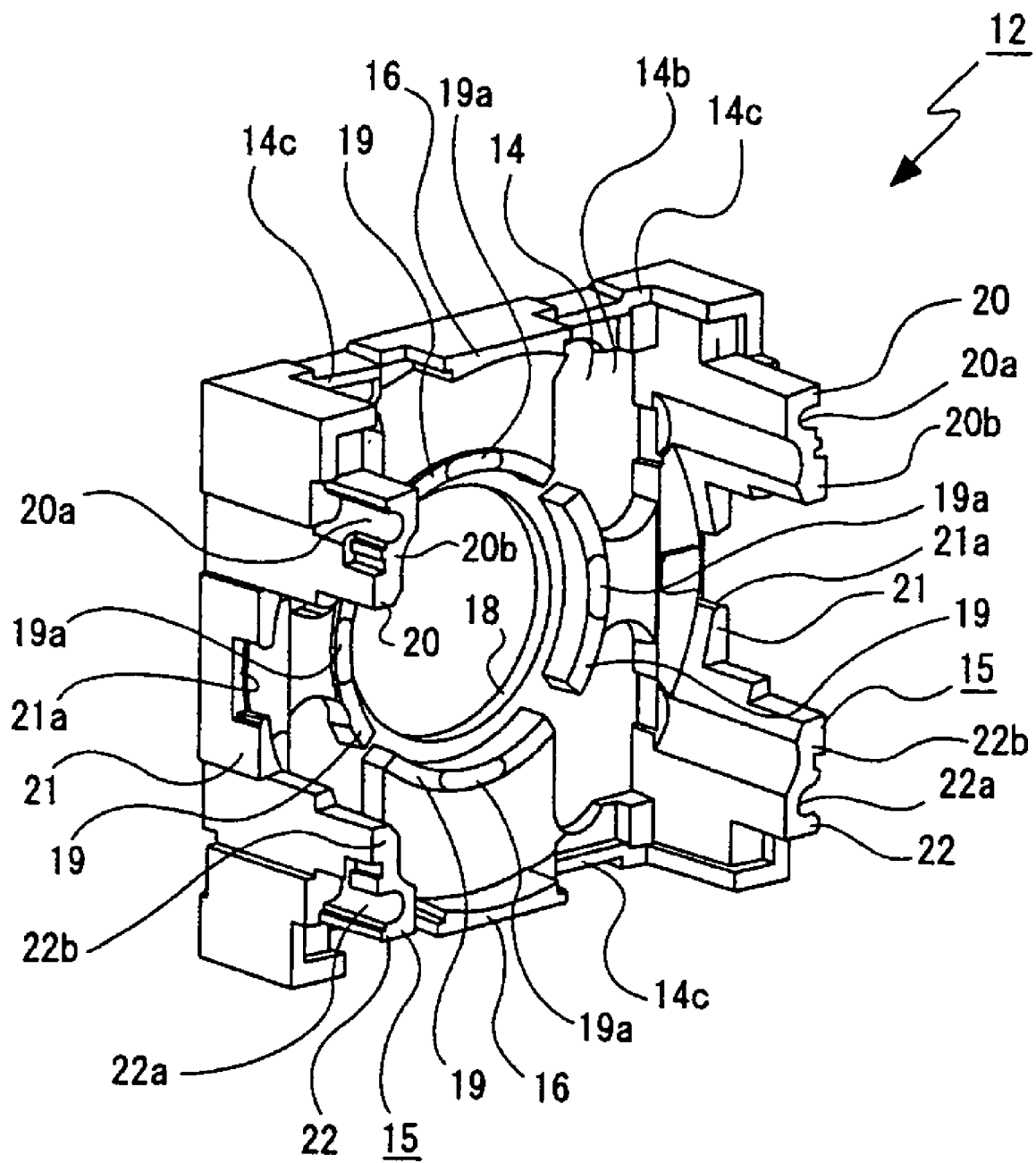
FIG. 8 is an enlarged perspective view showing a first member of the lens barrel when viewed from an angle that is different from that of FIG. 7.

As shown in FIGS. 7 and 8, the first member 12 is integrally formed with a base side section 14 facing forward and rearward, projections 15 projecting rearward from right and left edges of the base side section 14, and mating projections 16 projecting rearward from central portions of the upper and lower edges of the base side section 14.

A shallow and annular receiving recess 17 is formed at a front side 14a of the base side section 14 (see FIG. 7). A through hole 18 bored in the forward/rearward direction is formed in the central portion of the base side section 14.

Ribs 19 projecting rearward are provided in positions around the through hole 18 at a rear surface 14b of the base side section 14 (see FIG. 8). The ribs 19 are formed in a circular form, and they are provided in a circumferential direction at regular intervals, and respectively have pedestals 19a slightly projecting rearward on their rear surfaces. When the movable section, as will be described later, is moved forward, the pedestals 19a are allowed in contact with the movable section, and have a function to restrain forward movement of the movable section. A position where the movable section comes into contact with the pedestals 19a is considered as the macro end in a focusing operation.

It should be noted that in the imaging apparatus 1, as will be described later, by supplying a current to a drive coil, a linear actuator is driven such that the movable section is moved from an infinite point side to the macro end side. Alternatively, by controlling the amount of the current to be supplied, the movable section may be allowed to move to in front of the position where it comes into contact with the pedestals 19a, and such a front position may be set as the macro end, which is a front side of the moving edge of the movable section.

The projections 15 of the first member 12 are respectively formed with three vertically continuous sections, upper projections 20, middle projections 21, and lower projections 22, in that order from top to bottom (see FIGS. 7 and 8).

Concave positioning portions 20a and 22a, which open laterally and rearward, are formed on external surfaces of rear ends of the upper projections 20 and rear ends of the lower projections 22, respectively (see FIG. 8).

An amount of rearward projection of one of the upper projections 20 and one of the lower projections 22 is larger than that of the other. Outer edges of such further projected portions are formed as spring receiving surfaces 20b.

Amounts of rearward projections of the middle projections 21 from the base side section 14 are arranged to be smaller than the amounts of rearward projections of the upper projections 20 and the lower projections 22 from the base side section 14. In the middle projections 21, notched portions 21a, which respectively open rearward, are formed at central portions with respect to the vertical direction.

The upper, lower, and both side ends of the rear surface 14b of the base side section 14 are formed as four spring holding surfaces 14c (see FIG. 8). The spring holding surfaces 14c are respectively located between the upper projections 20 and the mating projection 16 and between the lower projections 22 and the mating projection 16.

Figure 9:
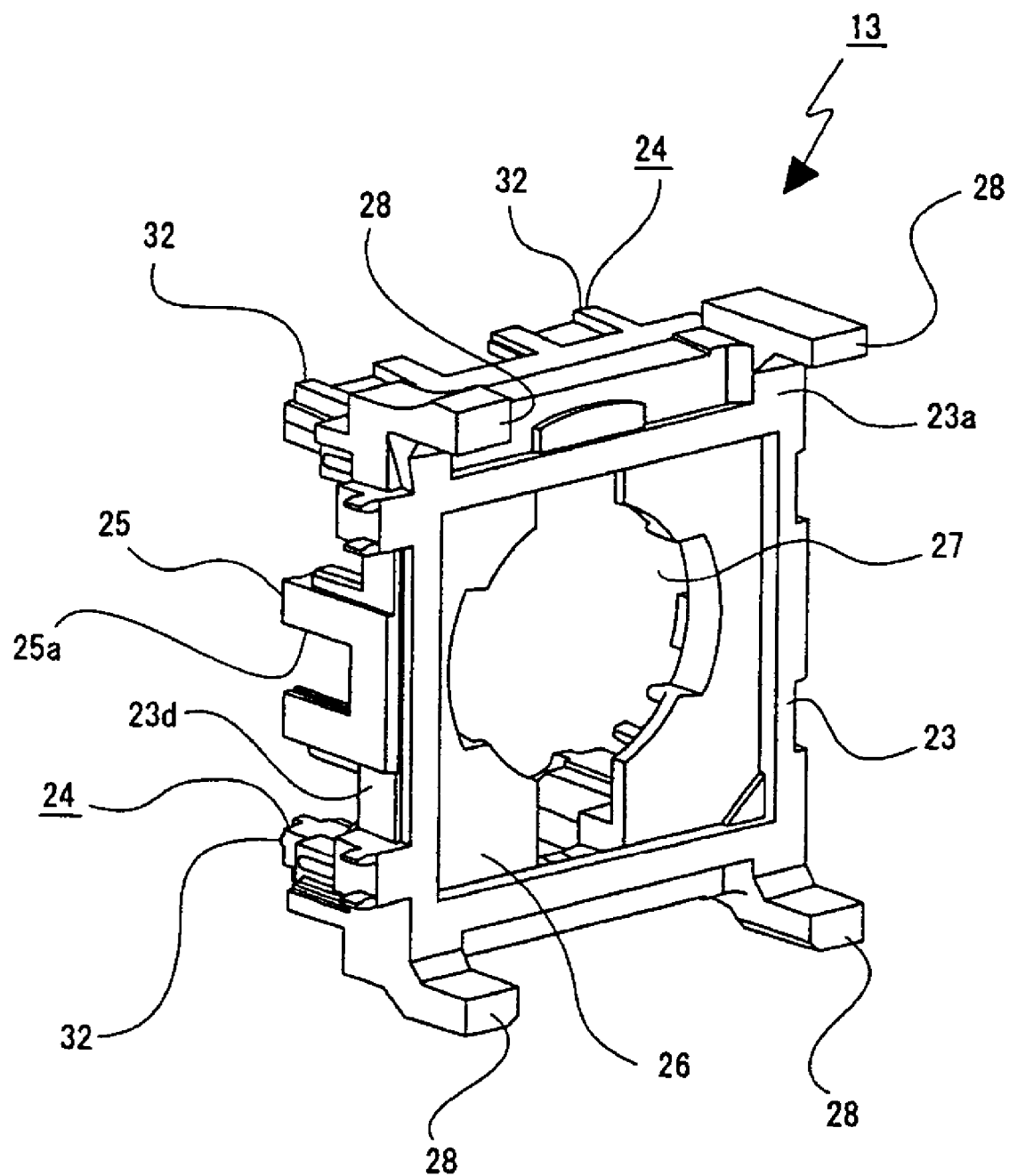
FIG. 9 is an enlarged perspective view showing a second member of the lens barrel when viewed from an angle that is different from that of FIG. 7.

As shown in FIGS. 7 and 9, the second member 13 is integrally formed with a base side portion 23 facing forward and rearward, projections 24 each projecting rearward from the upper and lower sides of the base side portion 23, and mating projections 25 each projecting rearward from the central portions of the right and left edges of the base side portion 23.

A shallow and rectangular mounting recess 26 is formed at a back side 23a of the base side portion 23 (see FIG. 9). A light transmitting hole 27 bored forward and rearward is formed in the central portion of the base side portion 23. The back side 23a of the base side portion 23 is provided with positioning projections 28 projecting rearward, respectively at the four corners.

Ribs 29 projecting forward are provided in positions around the light transmitting hole 27 at a front side 23b of the base side portion 23 (see FIG. 7). Front sides of the ribs 29 are provided with pedestals 29a slightly projecting forward, in a circumferential direction of the light transmitting hole 27 at separated positions. When the movable section is moved rearward, the pedestals 29a are contacted with the movable section and have a function to restrain rearward movement of the movable section. A position where the movable section comes into contact with the pedestals 29a serves as the infinite point for the focusing operation.

The front side 23b of the base side portion 23 is provided, at its right and left side ends, with positioning pins 30 spaced vertically (see FIG. 7). The sides, provided with the positioning pins 30 of the front side 23b of the base side portion 23 are formed as the spring receiving surfaces 23c.

A right side 23d of the base side portion 23 is provided with terminal mounting sections 31, which are spaced vertically.

The projections 24 of the second member 13 are provided as protrusions 32 such that a portion closer to the left side end and a portion closer to the right side end further protrude forward out than other portions. End sides of the protrusions 32 are respectively formed as spring holding surfaces 32a (see FIG. 7).

Positioning projection 33 projecting forward are respectively provided in the position immediately below the upper protrusions 32 and in the position immediately above the lower protrusions 32.

Notched portions 25a, which open rearward, are formed at the mating projections 25, respectively.

Figure 4:
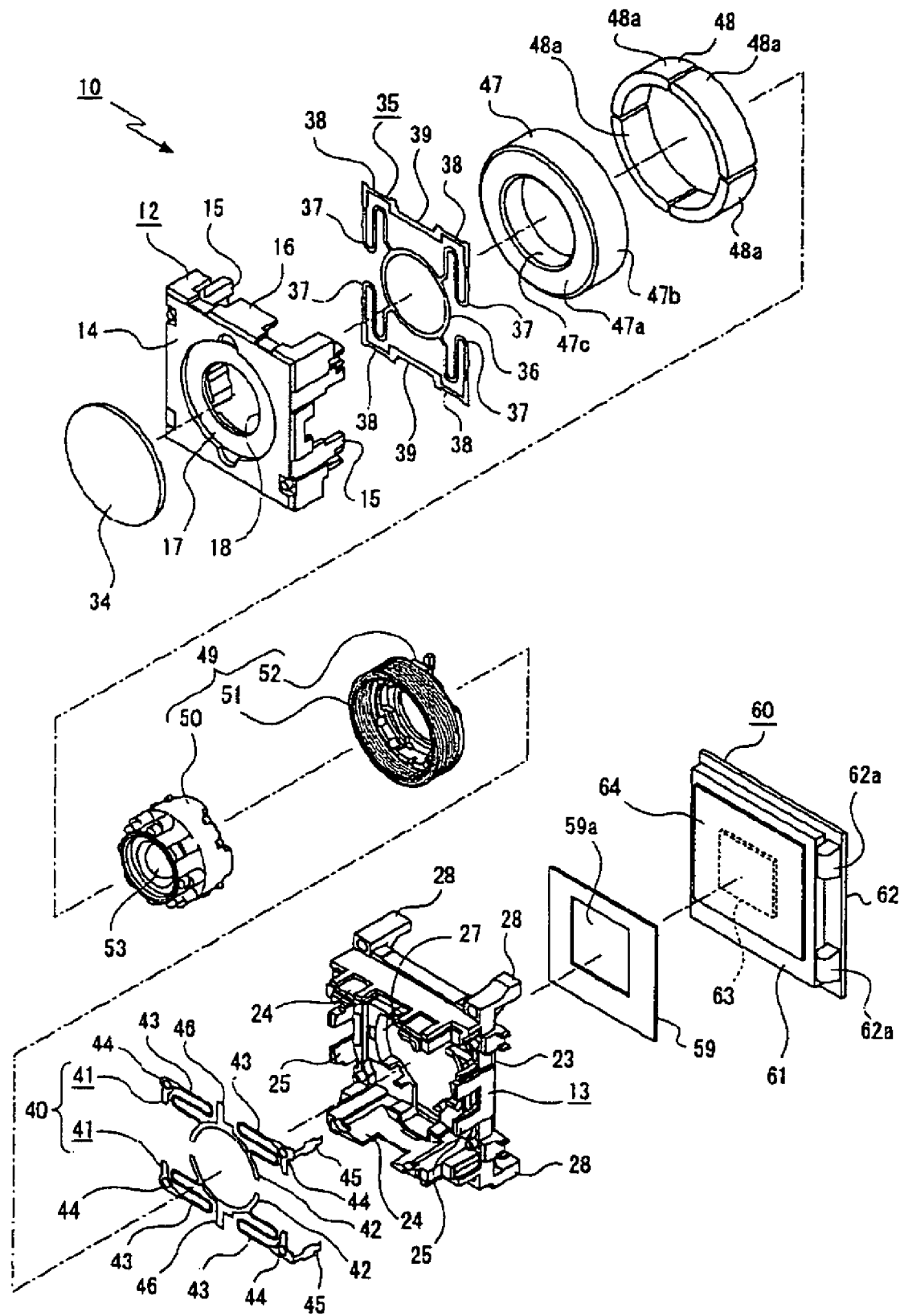
FIG. 4 is an exploded perspective view of an imaging unit which is partially assembled.
Figure 5:
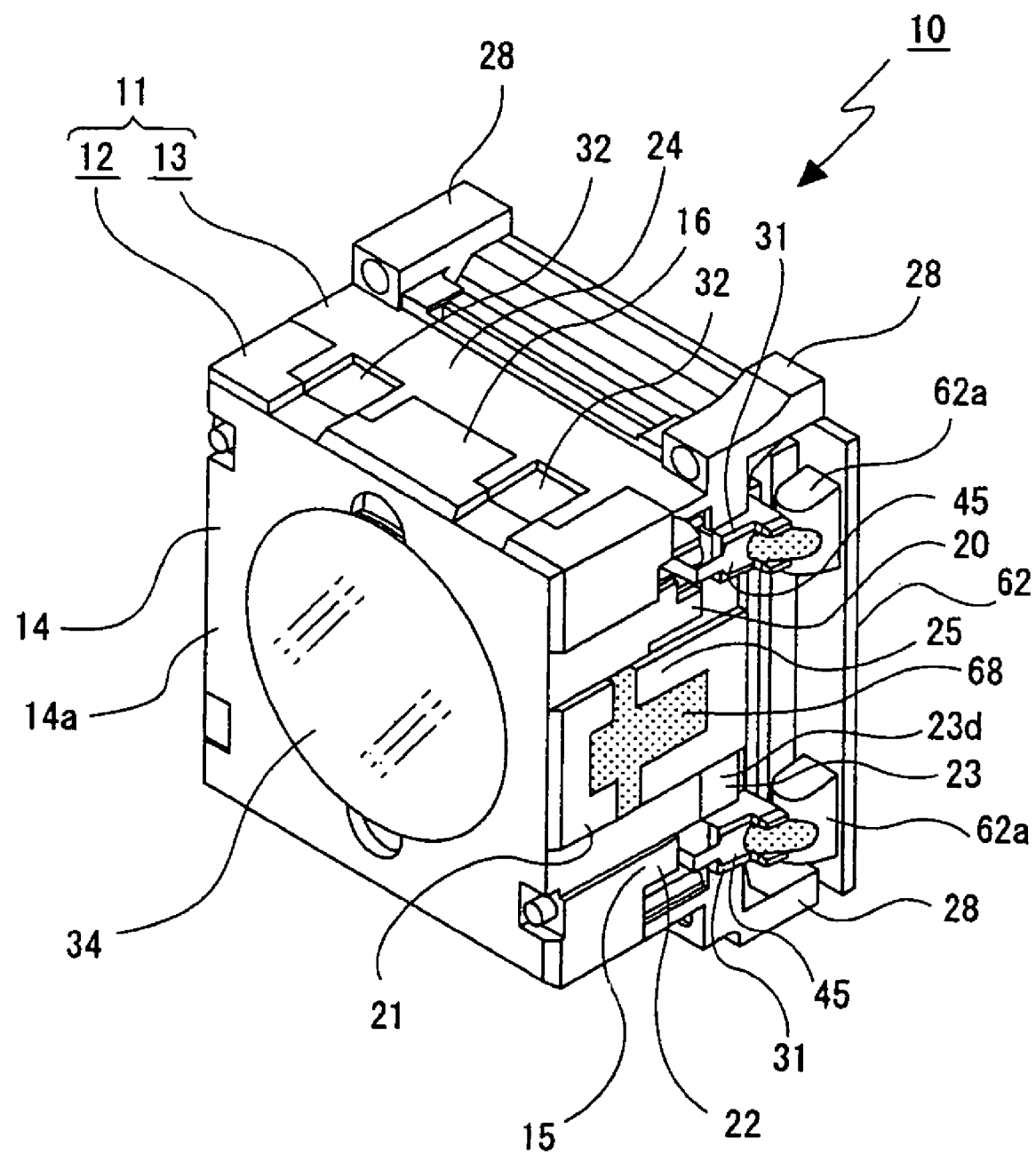
FIG. 5 is an enlarged perspective view of an imaging unit.

A cover glass 34 is attached, for example, by way of adhesion to the receiving recess 17 that is formed at the front side 14a of the first member 12 (see FIG. 3 through FIG. 5).

A first biasing blade spring 35 is attached to the lens barrel 11 (see FIGS. 3 and 4).

Figure 10:
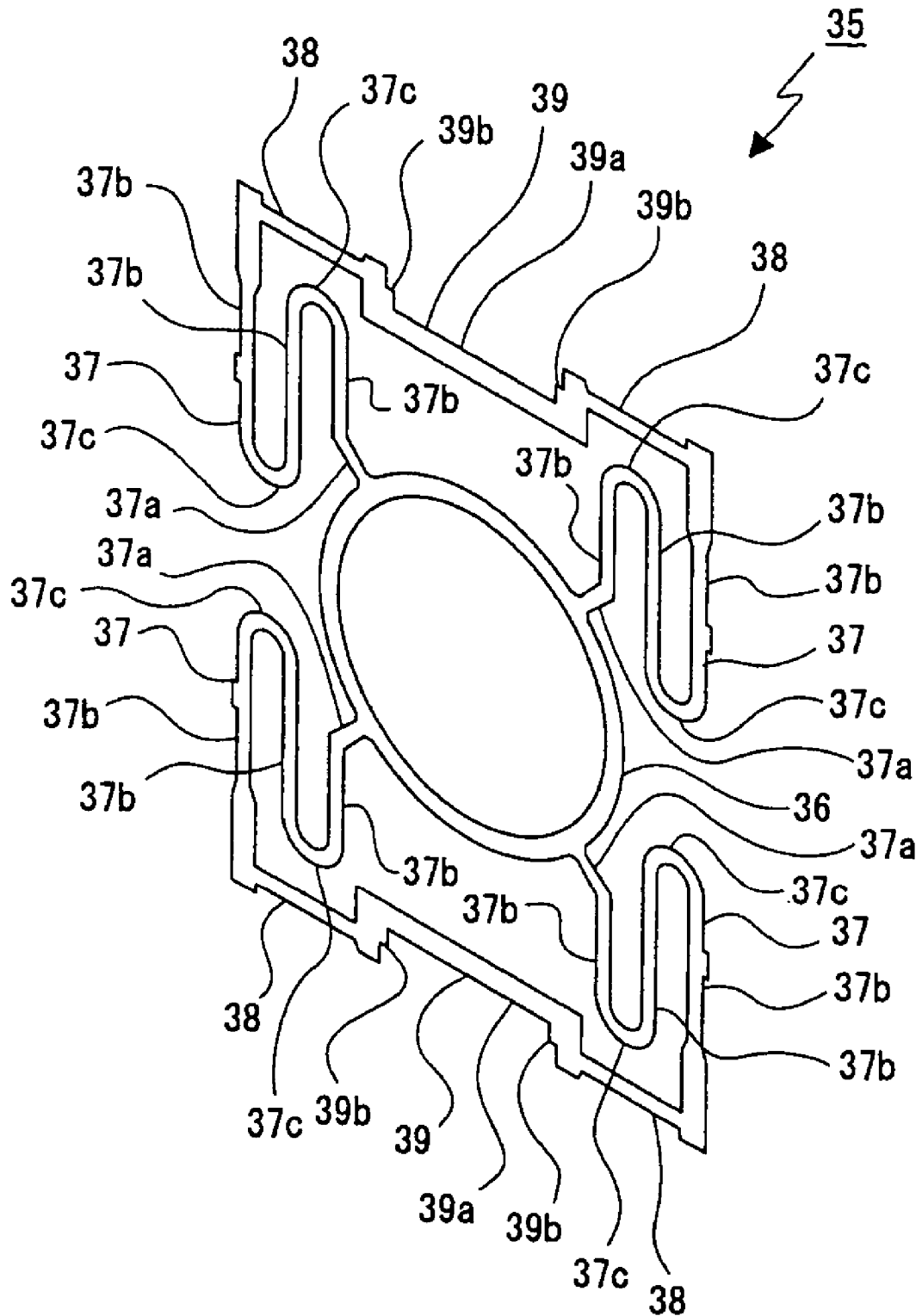
FIG. 10 is an enlarged perspective view of a first biasing blade spring.

The first biasing blade spring 35 is formed of a metal material, which is rich in elasticity, such as beryllium, copper, etc. The thickness direction of the first biasing blade spring 35 may be matched or substantially matched with the forward/rearward direction, i.e., the optical axis direction. For example, the thickness is set to 0.07 mm. As shown in FIG. 10, the first biasing blade spring 35 is integrally formed with a holding portion 36, four spring portions 37, four attachment portions 38, and connection portions 39.

The holding portion 36 is formed in a ring-shape.

The spring portion 37 is formed into a form substantially equal to a letter "S" lying horizontally, one end of which extends to a respective one of positions that are positioned at the same interval in the circumference direction of the holding portion 36. The spring portion 37 is formed with an inclined portion 37a slightly projecting from the holding portion 36 in a radial direction, three parallel line portions 37b extending vertically, and arc-shaped curve portions 37c which interconnect the adjacent line portions 37b. An end of the line portion 37b located in the innermost portion is extended to an end of the inclined portion 37a.

The attachment portions 38 are elongated in the right and left direction, and each outer end is extended to a respective one of the ends of the line portions 37b located in the outermost part.

The connection portions 39 are formed with horizontal portions 39a extending in the right and left direction, and perpendicular portions 39b slightly extending vertically, in which one end of a respective one of the perpendicular sections extends to a respective one of right and left ends of the horizontal portions 39a. The other end of each one of the perpendicular portions 39b extends to an inner end of a respective one of the attachment portions 38 The connection portions 39 are located such that the horizontal portions 39a are closer to the holding portion 36 than to the attachment portions 38.

Since the spring portions 37 are axisymmetric in the vertical direction and also axisymmetric in the left-right direction, the first biasing blade spring 35 is configured such that each of the spring portions 37 provides the same spring force.

In the first biasing blade spring 35, the spring portions 37 are elastically deformed in the forward/rearward bending direction. Accordingly, the holding portion 36 moves in the forward/rearward direction with respect to the attachment portions 38, i.e., in the optical axis direction. Force produced during the movement in the plane orthogonal to the optical axis is refrained by the line portions 37b and the curve portions 37c, thus allowing the holding portion 36 to move only in the optical axis direction.

The first biasing blade spring 35 is attached to the lens barrel 11 such that the attachment portions 38 are respectively held by the spring holding surfaces 14c of the first member 12 and the spring holding surfaces 32a of the second member 13.

When the first biasing blade spring 35 is not elastically deformed, the first biasing blade spring 35 is configured such that surfaces in the thickness direction of each one of the holding portion 36, the spring portions 37, the attachment portions 38, and the connection portions 39 are respectively positioned in the same planes. In other words, the first biasing blade spring 35 may be formed simply by processing a plate-like material, thus making manufacturing thereof easy.

The second biasing blade spring 40 is attached to the lens barrel 11 (see FIGS. 3 and 4).

The second biasing blade spring 40 is formed of a metal material, which has elasticity, such as beryllium, copper, etc. The thickness direction of the second biasing blade spring 40 may be matched or substantially matched with the forward/rearward direction, i.e. the optical axis direction, except for the connecting terminal portion to be described later. The thickness is set to 0.05 mm, for example. The second biasing blade spring 40 is formed with two spring members 41 having a shape axisymmetric in the vertical direction.

Figure 11:
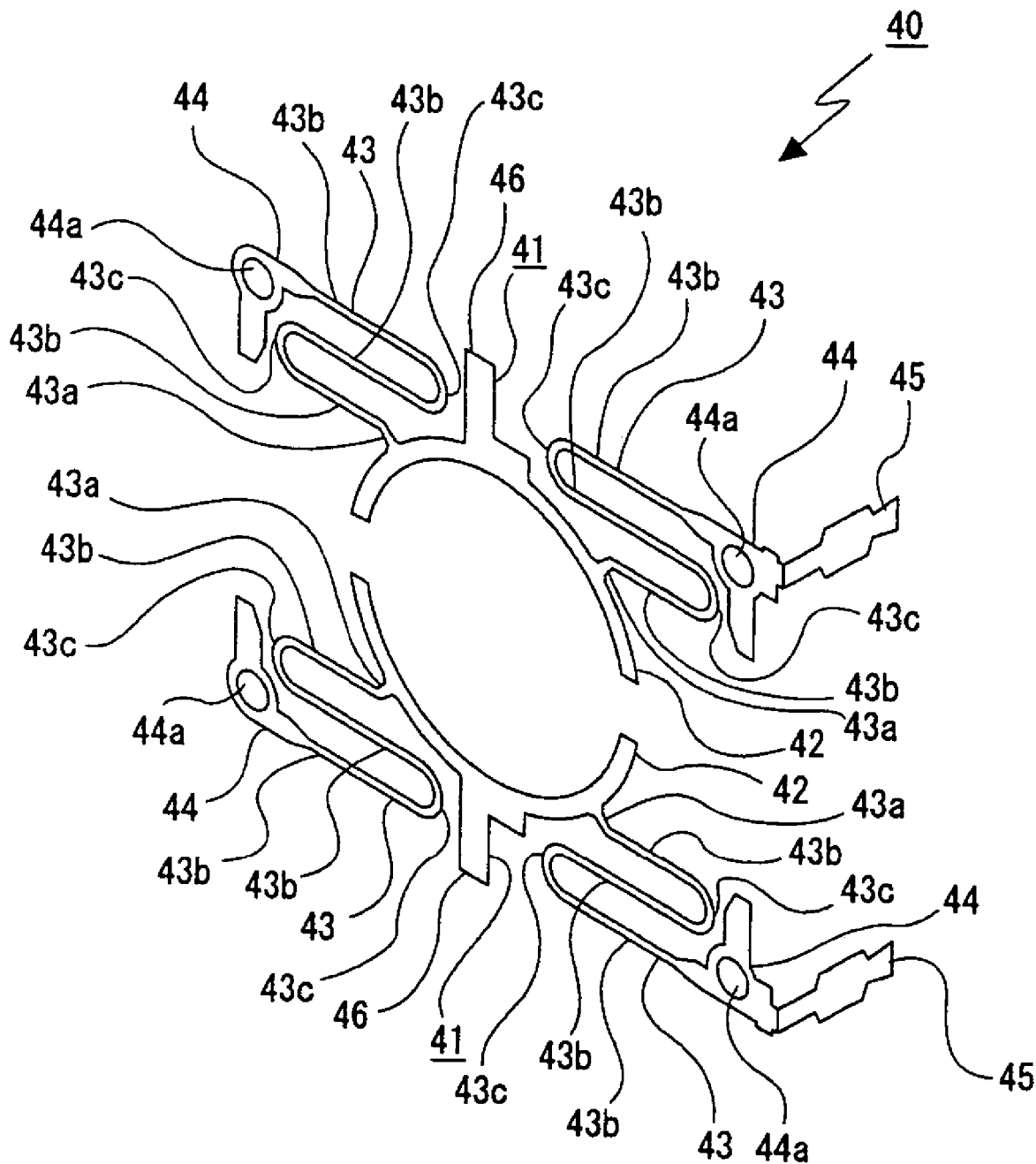
FIG. 11 is an enlarged perspective view of a second biasing blade spring.

As shown in FIG. 11, the spring member 41 is integrally formed with a holding portion 42, two spring portions 43, two attachment portions 44, a connecting terminal portion 45, and a coil connecting portion 46.

The holding portion 42 is formed in a semi-ring shape.

The spring portion 43 is formed into a form substantially equal to the letter "S", one end of which extends to a respective one of portions which are separated at the same interval in the circumference direction of the holding portion 42. The spring portion 43 is formed with an inclined section 43a slightly projecting from the holding portion 42 in a radial direction, three parallel line portions 43b extending in the right and left direction, and arc-shaped curve portions 43c which interconnect the adjacent line portions 43b. An end of the line portion 43b located in the innermost portion is extended to an end of the inclined section 43a.

Each of the attachment portions 44 is extended to an end of a respective one of the line portions 43b, one end of which is located in the outermost position. Positioning holes 44a are formed in the attachment portions 44, respectively.

The connecting terminal portion 45 is extended to one attachment portion 44 and bent by approximately 90 degrees to this attachment portion 44, and the projects rearward.

The coil connecting portion 46 projects in the radial direction from a circumferentially central portion of the holding portion 42, and it is provided in the central portion between portions respectively connecting the holding portion 42 and the spring portions 43.

Since the spring portions 43 are axisymmetric in the vertical direction and also axisymmetric in the left-right direction, the second biasing blade spring 40 is configured such that each of the spring portions 43 may provide the same spring force.

In the second biasing blade spring 40, the spring portions 43 are elastically deformed in the forward/rearward bending direction so that the holding portion 42 moves in the forward/rearward direction with respect to the attachment portions 44, i.e., in the optical axis direction. Force produced during the movement in the plane orthogonal to the optical axis is restrained by the line portions 43b and the curve sections 43c, thus allowing the holding portion 42 to move only in the optical axis direction.

A thickness of the second biasing blade spring 40 is thinner than a thickness of the first biasing blade spring 35, and a spring force of the first biasing blade spring 35 is larger than a spring force of the second biasing blade spring 40.

The second biasing blade spring 40 is attached to the lens barrel 11 such that each of the positioning pins 30 of the second member 13 is inserted into respective one of the positioning holes 44a formed at the attachment portions 44, and the attachment portions 44 are held by the first member 12 and the second member 13.

When the second biasing blade spring 40 is not being elastically deformed, the second biasing blade spring 40 is configured such that surfaces in the thickness direction of each one of the holding portions 42, the spring portions 43, the attachment portions 44, and the coil connection portions 46 are respectively positioned in the same planes. When the connecting terminal portions 45 of the second biasing blade spring 40 are not being bent by approximately 90 degrees with respect to the attachment portions 44, surfaces in the thickness direction of each of the connecting terminal portions 45 and surfaces in the thickness direction of each one of the attachment portion 44 are respectively positioned in the same planes. Accordingly, the second biasing blade spring 40 may be formed by simply processing a plate-like material, thus making the manufacturing thereof easy.

Figure 6:
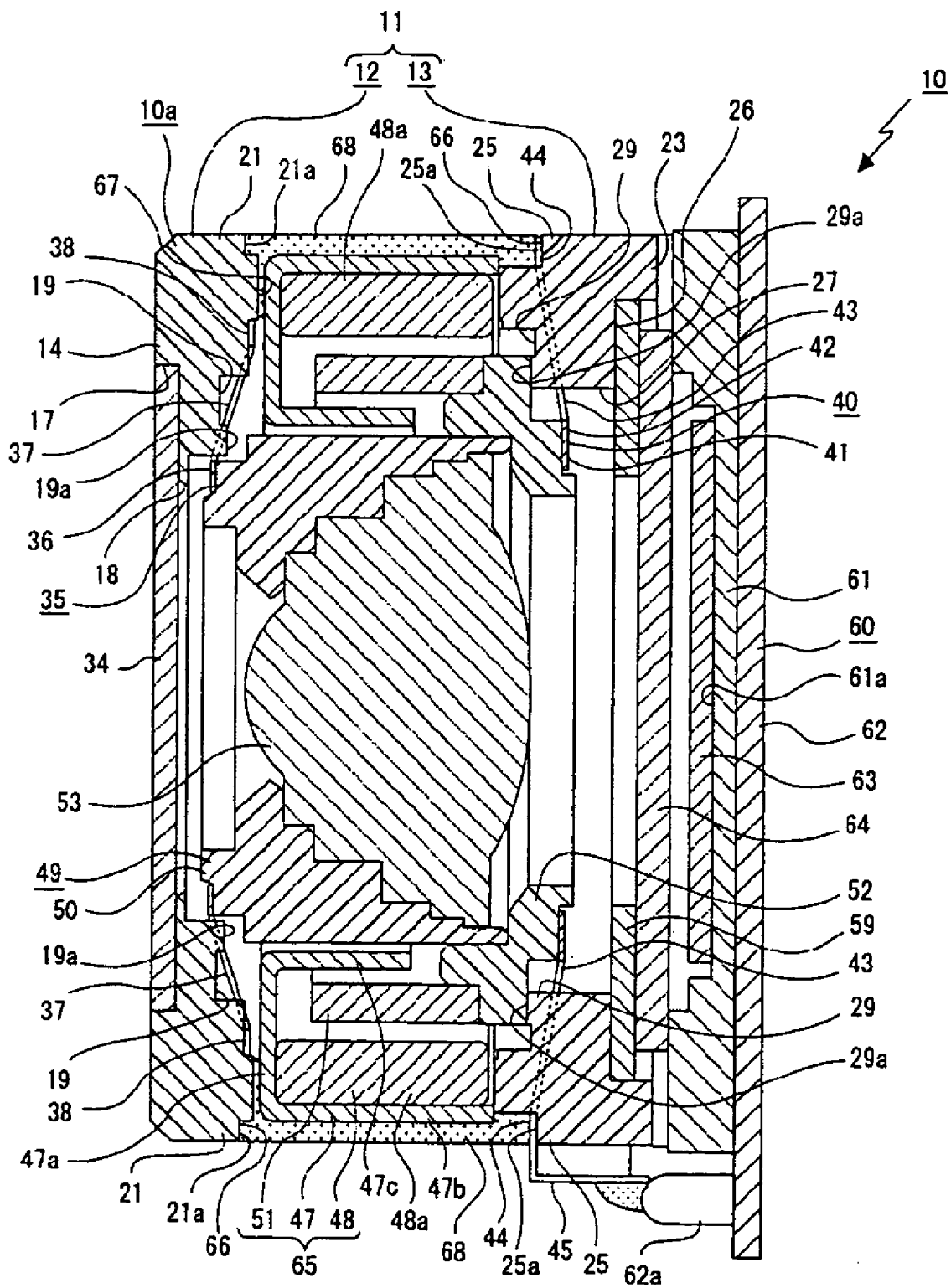
FIG. 6 is a schematically enlarged sectional view of an imaging unit whose movable section is held at an infinite point.

A yoke 47 is provided inside the lens barrel 11 (see FIGS. 3, 4, and 6). The yoke 47 is formed of a magnetic metal material, and with a base 47a formed in a ring, a perimeter portion 47b projecting rearward from a perimeter of this base 47a, and an inner periphery portion 47c projecting rearward from an inner periphery of the base 47a.

A drive magnet 48 is provided inside the yoke 47. The drive magnet 48 is formed with four portions 48a formed in the same shape and the same size, and it is mounted in the yoke 47 such that each of the portions 48a is in contact with the base 47a and the perimeter portion 47b of the yoke 47 (see FIG. 6).

A movable section 49 is arranged inside the lens barrel 11 in such a way that the movable section 49 is allowed to move in the optical axis direction. The movable section 49 has a lens holder 50, a drive coil 51, and a coil holder 52 (see FIGS. 3 and 4).

Figure 12:
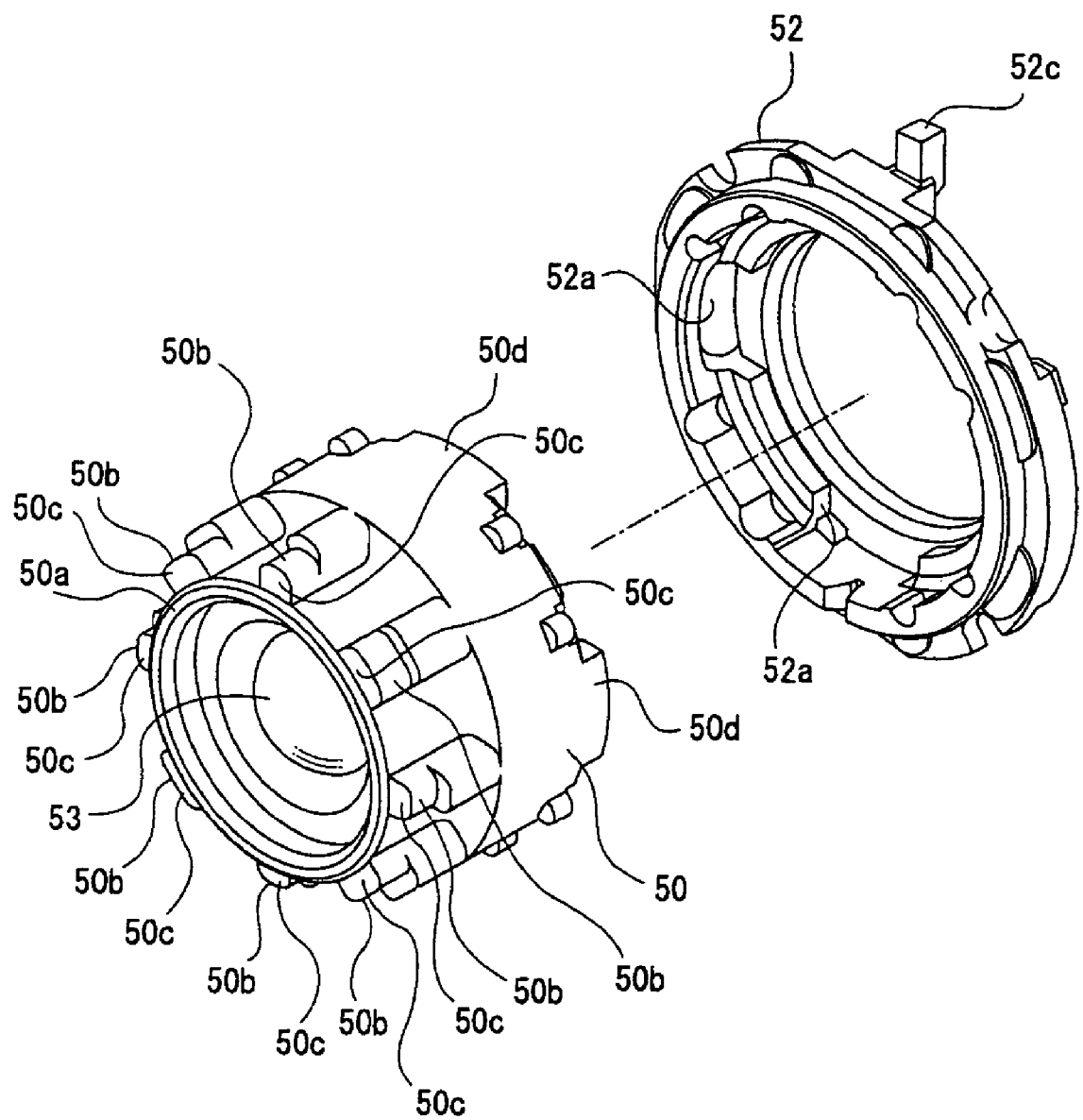
FIG. 12 is an enlarged perspective view showing a lens holder and a coil holder.

As shown in FIG. 12, the lens holder 50 is formed in a substantially cylindrical shape, and is provided at its front end with a positioning ring section 50a. Holding ribs 50b are provided in the positions closer to the front end of a perimeter of the lens holder 50 at regularly spaced intervals in a circumferential direction. Front edges of the holding ribs 50b are connected with a trailing edge of the positioning ring section 50a. Surfaces of the holding ribs 50b connecting to the trailing edge of the positioning ring section 50a are formed as contact surfaces 50c perpendicular to the optical axis direction. A trailing edge of the lens holder 50 is provided with mating projections 50d, which are circumferentially spaced from each other.

A plurality of movable lenses which collectively function as a focal lens, a lens block 53 which has a fixed iris diaphragm, etc. are mounted inside the lens holder 50 (see FIGS. 3 and 6).

The drive coil 51 is wound and formed into a ring, and its outer diameter is smaller than an outer diameter of the drive magnet 48 (see FIGS. 3, 4, and 6).

The coil holder 52 is thin and formed into a substantially ring-shape. Circumferentially spaced mating recesses 52a are formed at an inner periphery (see FIG. 12). A rear surface of the coil holder 52 is provided with a positioning ring section 52b (see FIG. 13). Both upper and lower ends of the coil holder 52 are respectively provided with projections 52c for coil winding, which are respectively projected upward and downward.

Figure 13:
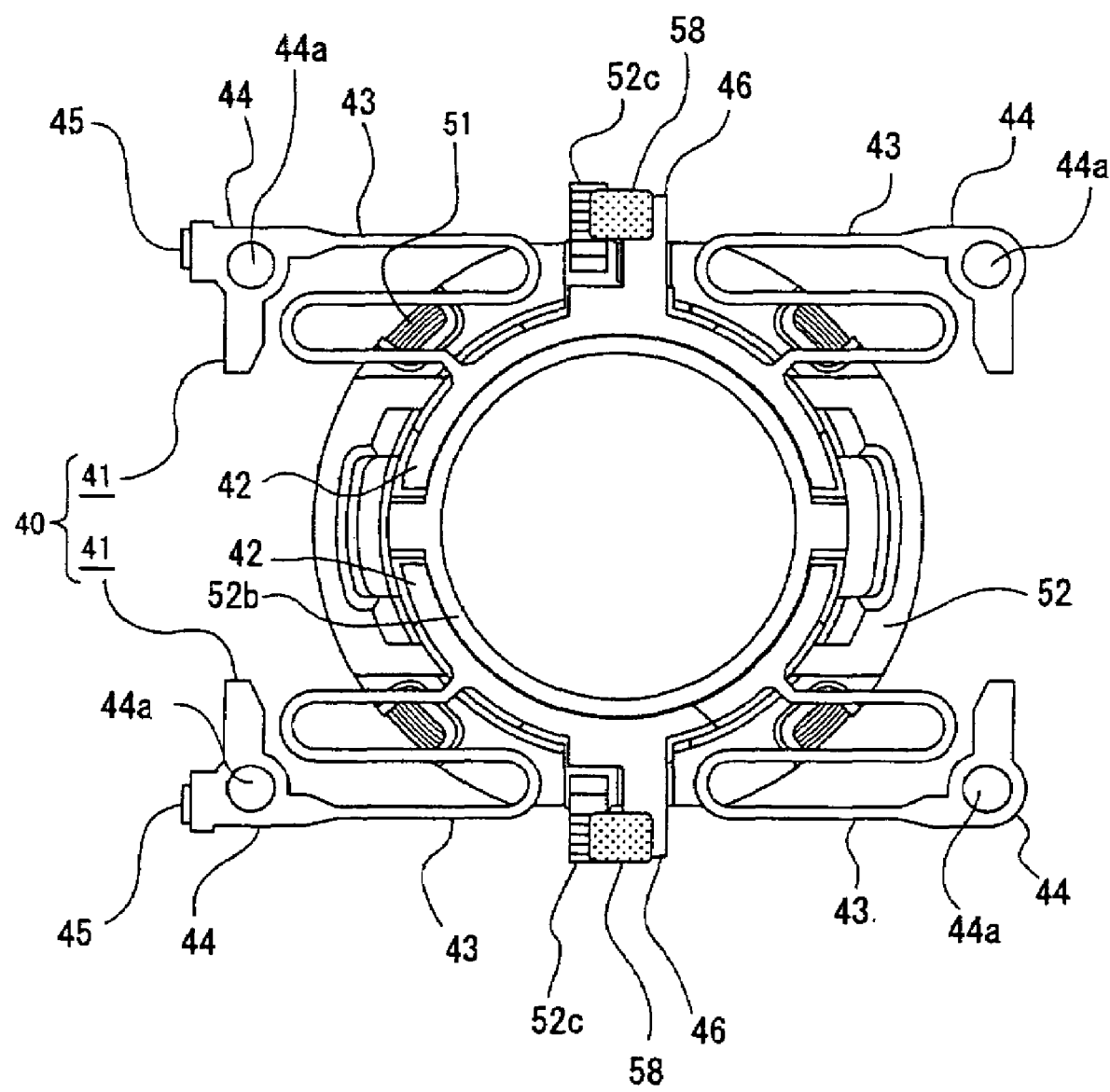
FIG. 13 is an enlarged rear view showing a situation where a second biasing blade spring is attached to a coil holder.
Figure 14:
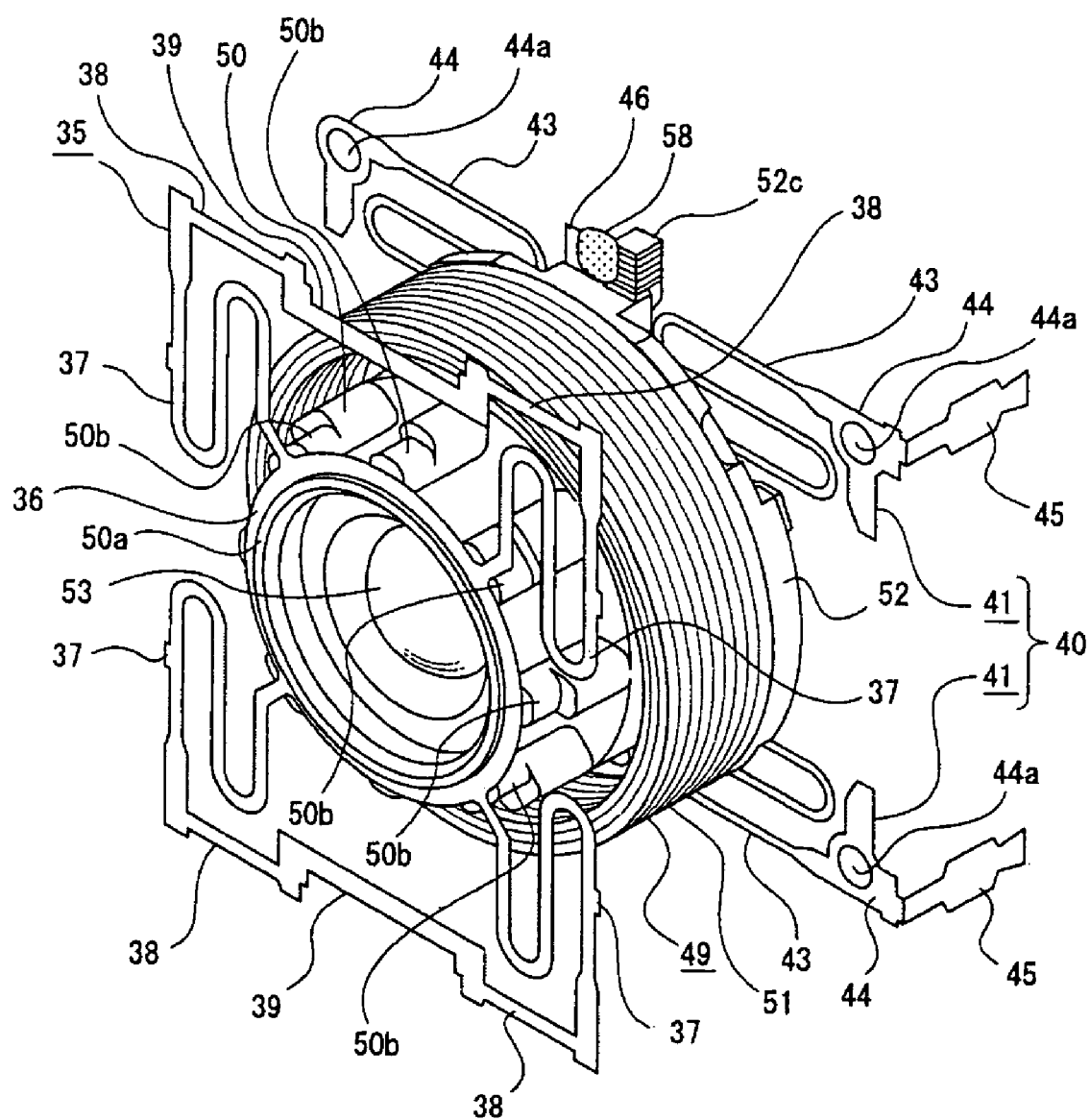
FIG. 14 is an enlarged perspective view showing a situation where a first biasing blade spring and a second biasing blade spring are attached to a movable section.

The movable section 49 is configured such that the lens holder 50 to which the drive coil 51 and the lens block 53 are attached is mounted to the coil holder 52 (see FIGS. 3 and 14). The drive coil 51 is attached to a perimeter portion at the front of the coil holder 52. Being attached to the coil holder 52, each end is wound around a respective one of the coil winding projections 52c of the coil holder 52 (see FIGS. 13 and 14). The lens holder 50 is mounted to the coil holder 52 as the mating projections 50d are fitted into the mating recesses 52a, respectively.

The movable section 49 is held by the holding portion 36 of the first biasing blade spring 35 and the holding portions 42 of the second biasing blade spring 40 (see FIG. 14).

As shown in FIG. 14, the holding portion 36 of the first biasing blade spring 35 is fitted onto the positioning ring section 50a and brought into abutted to the contact surfaces 50c of the holding ribs 50b, thus being attached to the lens holder 50. As shown in FIG. 13, the holding portions 42 of the second biasing blade spring 40 are fitted onto the positioning ring section 52b and brought into abutted to the rear surface of the coil holder 52, thus being attached to this coil holder 52.

When the second biasing blade spring 40 is attached to the coil holder 52, as shown in FIGS. 13 and 14, the coil connecting portions 46 of the second biasing blade spring 40 are respectively adjacent to the coil winding projections 52c of the coil holder 52. Each end of the drive coil 51 which is wound around a respective one of the coil winding projections 52c is connected to a respective one of the coil connecting portions 46 by solder 58.

A shading sheet 59 and an imaging section 60 are attached to the second member 13 (see FIGS. 3 and 4).

The shading sheet 59 has a through hole 59a in the central part, and is disposed and attached at the mounting recess 26 formed at the back 23a of the second member 13 (see FIG. 6).

The imaging section 60 is formed with an imager housing 61, a control circuit board 62, an imager device 63, and a cover 64.

A shallow recess 61a opening forward is formed at the imager housing 61, and the imager device 63 is arranged at this recess 61a. For example, a CCD (Charge Coupled Device) may be used as the imager device 63.

The control circuit board 62 is a circuit board for controlling the imager device 63 and supplying a current to the drive coil 51. A right end portion of the board is provided with connecting portions 62a that are vertically spaced and project forward (see FIGS. 3 and 4). The control circuit board 62 is attached to the rear surface of the imager housing 61, and the second member 13 of the control circuit board 62 is positioned by positioning projections 28 that are provided for the second member 13, when the control circuit board 62 is attached to the imager housing 61.

The cover 64 is attached to the front of the imager housing 61, and it protects the imager device 63.

The imaging section 60 is attached to a rear surface 13a of the second member 13 after the shading sheet 59 is attached.

Below, an assembling procedure for the imaging unit 10 will be described.

First, the second biasing blade spring 40 is assembled to the second member 13. As described above, the assembly of the second biasing blade spring 40 to the second member 13 is carried out by respectively inserting the positioning pins 30 of the second member 13 into the positioning holes 44a, which are formed at the attachment portions 44 of the respective spring members 41. At this time, the connecting terminal portions 45 of the second biasing blade spring 40 are disposed at the terminal mounting sections 31 of the second member 13, respectively.

Next, the movable section 49 is assembled to the second biasing blade spring 40. In a situation where the movable section 49 is assembled to the second biasing blade spring 40, the movable section 49 is held by the holding portions 42 of the second biasing blade spring 40, as described above.

Subsequently, the yoke 47 to which the drive magnet 48 is attached is assembled to the second member 13. The yoke 47 is assembled by fitting into the second member 13. The yoke 47 is positioned so that its trailing end is in abutment with a predetermined portion inside the second member 13 (see FIG. 6). Having the yoke 47 mounted to the second member 13, the drive coil 51 is positioned between the inner periphery portion 47c of the yoke 47 and the drive magnet 48.

Accordingly, the linear actuator 65 is formed with the yoke 47, the drive magnet 48, and the drive coil 51, by arranging the drive coil 51 between the inner periphery portion 47c of the yoke 47 and the drive magnet 48 (see FIG. 6).

Next, the first biasing blade spring 35 is assembled to the movable section 49. As described above, the assembly of the first biasing blade spring 35 to the movable section 49 is carried out by fitting the holding portion 36 onto the positioning ring section 50a, and bringing it into abutment with the contact surfaces 50c of the holding ribs 50b Having the first biasing blade spring 35 assembled to the movable section 49, the attachment portions 38 of the first biasing blade spring 35 are positioned on the spring holding surfaces 32a which are respective front ends of the protrusions 32 of the second member 13.

Subsequently, the first member 12 is assembled to the second member 13, combining the first member 12 and the second member 13. The assembly of the first member 12 to the second member 13 is carried out by inserting and fitting the positioning pins 30 of the second member 13 into the positioning sections 20a and 22a of the first member 12, respectively.

As described above, the positioning pins 30 are inserted into the positioning holes 44a of the second biasing blade spring 40, respectively. Accordingly, the positioning pins 30 have a function of combining and positioning three members, which are the second biasing blade spring 40, the first member 12, and the second member 13. Accordingly, it is possible to improve the accuracy of positioning the second biasing blade spring 40, the first member 12 and the second member 13, and to reduce the number of components by sharing the positioning pins 30

In the example shown above, the second member 13 is provided with the positioning pins 30, and the positioning sections 20a and 22a into which the positioning pins 30 are inserted are formed at the first member 12. Alternatively, the first member 12 may be provided with positioning pins, and positioning sections into which the positioning pins are inserted may be formed at the second member 13. In this case, for example, the positioning holes into which the positioning pins are inserted may be formed in the first biasing blade spring 35 without forming the positioning holes 44a in the second biasing blade spring 40.

After the first member 12 and the second member 13 are combined, one projection 24 of the second member 13 may be inserted between the upper ends of the projections 15 of the first member 12, and the other projection 24 of the second member 13 may be inserted between the lower ends of the projections 15 of the first member 12, whereby the projections 15 and 24 form a square tube-shaped portion.

Accordingly, the lens barrel 11 is easy to assemble, and the movable section 49 whose outer shape is substantially circular or round when viewed along the optical axis direction is constructed to be enclosed in the box-like lens barrel 11, so that the imaging unit 10 including the lens unit 10a may be made in a smaller size. Furthermore, since the lens barrel 11 is formed into the box-shaped structure which is formed with the base side sections 14, 23 and the projections 15, 24, it is possible to realize a structure having less gaps or clearance, thus preventing dirt from entering inside the lens barrel 11.

As mentioned above, when the first member 12 and the second member 13 are combined, the attachment portions 38 of the first biasing blade spring 35 are sandwiched and held by the spring holding surfaces 14c of the first member 12 and the spring holding surfaces 32a of the second member 13. Simultaneously, the attachment portions 44 of the second biasing blade spring 40 are pressed against the spring receiving surfaces 23c of the second member 13, and held by the spring receiving surfaces 20b and 22b of the upper projections 20 and the lower projections 22 of the first member 12.

Thus, the attachment portions 38 of the first biasing blade spring 35 and the attachment portions 44 of the second biasing blade spring 40 are held by the first member 12 and the second member 13, and therefore a process, such as adhesion, is not particularly necessary in order to attach the first biasing blade spring 35 and the second biasing blade spring 40 to the lens barrel 11. Accordingly it is possible to improve the flexibility of operation in a process of assembling the imaging unit 10 including the lens unit 10a.

Furthermore, since the attachment portions 38 of the first biasing blade spring 35 are held and fixed by the base side section 14 of the first member 12 and the projections 24 of the second member 13, and since the attachment portions 44 of the second biasing blade spring 40 are held and fixed by the base side portion 23 of the second member 13 and the projections 15 of the first member 12, the fixing positions (with respect to the lens barrel 11) of the first biasing blade spring 35 and the second biasing blade spring 40 are different and orthogonal to each other, whereby the first biasing blade spring 35 and the second biasing blade spring 40 can be attached easily, without making the first member 12 and the second member 13 into a complicated structure.

Next, the cover glass 34 is attached to the first member 12, and the shading sheet 59 and the imaging section 60 are attached to the second member 13. It should be noted that the attachment of the cover glass 34 to the first member 12 may be carried out, before assembling the first biasing blade spring 35, the second biasing blade spring 40, the movable section 49, etc.

Next, the connecting portions 62a of the imaging section 60 attached to the second member 13 are respectively connected with the connecting terminal portions 45 of the second biasing blade spring 40 by way of soldering or the like.

After the first member 12 and the second member 13 are combined and the lens barrel 11 is formed, the mating projections 16 of the first member 12 are inserted and fitted between the protrusions 32 of the second member 13 (see FIG. 5).

Figure 15:
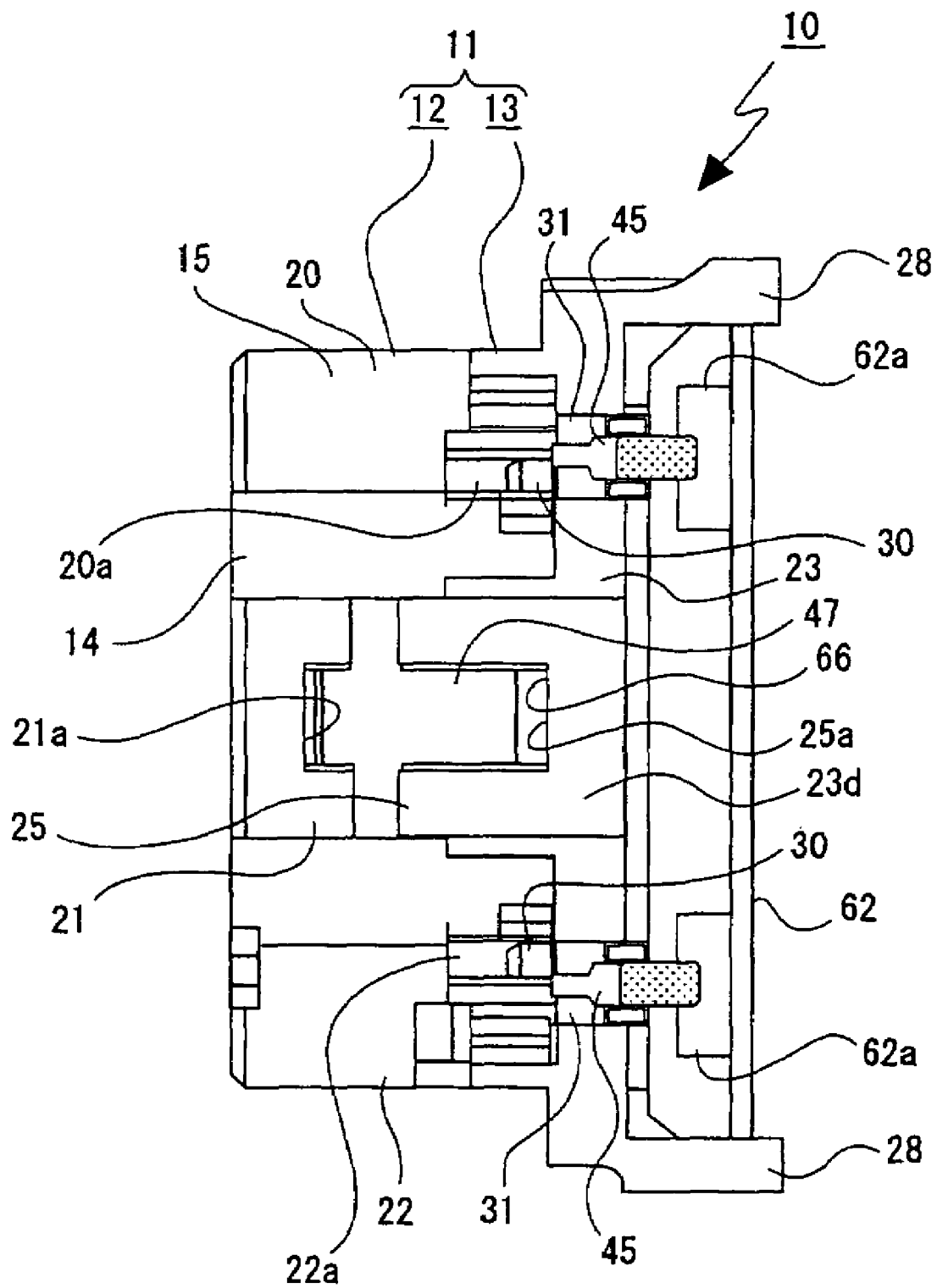
FIG. 15 is an enlarged side view of an imaging unit before adhesion is carried out.

The mating projections 25 of the second member 13 are respectively inserted and fitted between the upper projections 20 of the first member 12 and the lower projections 22, while front ends of the mating projections 25 are located apart from the front end of the middle projections 21 (see FIG. 15). Accordingly, a cross-shaped opening, which communicates with the inside of the lens barrel 11, is formed among the mating projections 25 and the middle projections 21. This opening serves as adhesion holes 66. The perimeter portion 47b of the yoke 47 is located in the position corresponding to the adhesion holes 66 (see FIG. 6).

Furthermore, when the first member 12 and the second member 13 are combined, a predetermined space 67 is formed between the rear surface 14b of the base side section 14 of the first member 12 and the base 47a of the yoke 47. This space 67 communicates with the adhesion holes 66 (see FIG. 6).

Adhesives 68 are injected and applied to the adhesion holes 66 formed at the lens barrel 11. The adhesives 68 may be ultraviolet curing type adhesives, for example.

The adhesives 68 applied to the adhesion holes 66 penetrate through the adhesion holes 66 and into the space 67 formed between rear surface 14b of the base side section 14 and the base 47a of the yoke 47. As the adhesives 68 in the adhesion holes 66 are hardened, three members, which are the first member 12, the second member 13 and the yoke 47, are adhered together (see FIG. 6). Further, the first member 12 and the yoke 47 are adhered together as the adhesives 68 are cured in the space 67.

As described above, the lens unit 10a, is configured such that three members of the first member 12, the second member 13 and the yoke 47 are adhered together by the adhesives 68 applied to the adhesion holes 66, and the first member 12 and the yoke 47 are adhered together by the adhesives 68 penetrated into the space 67. Accordingly, the bonding strength among the first member 12, the second member 13 and the yoke 47 is high, and anti-vibration performance and drop-and-impact strength may be improved.

Further, the adhesion holes 66 are formed into a cross-shape, respectively, thus leading to an improvement in bonding strength.

Alternatively, an epoxy resin adhesive may be used as the adhesives 68. However, when the epoxy resin adhesive is used, there is a drawback. Although a two part adhesive has a high cure rate, its management is troublesome. There is also a drawback with a one part adhesive. Although its management is easy, its cure rate is low. As mentioned above, therefore, by using the ultraviolet curing adhesive as the adhesives 68, it is possible to facilitate the management of the adhesive and shorten an adhesion process. Especially, when the epoxy resin adhesive is used, it needs the cure time of 30 minutes or more. However, the ultraviolet curing adhesive needs the cure time of from 5 seconds to 30 seconds, which considerably shortens the time required for the process of assembling the imaging unit 10 including the lens unit 10a.

Further, when a one-part, thermosetting, epoxy-resin adhesive is used, it may lead to problems such that not only the cure time is longer but also a dedicated heat treat furnace is needed. Accordingly, the manufacturing cost may be higher, and the heat treatment may cause the lens to be eccentric, etc. However, it is possible to avoid these problems by using ultraviolet curing adhesives as the adhesives 68.

In general, it is known that an ultraviolet curing adhesive has a smaller bonding strength with a metal compared with that of a resin. However, it is possible to fix the yoke 47 firmly to the lens barrel 11 since the adhesives 68 allow the adhesion between the first member 12 and the second member 13 which are both formed of the resin material in addition to the adhesion between the yoke 47 formed of a metal material and the first member 12 and the second member 13 formed of a resin material, as described above.

In the lens unit 10a, since the positioning sections 20a, 22a formed in the upper projections 20 and the lower projections 22 of the first member 12 are each arranged to have concaved-shape and open to the lateral direction, the positioning pins 30 inserted into the positioning sections 20a, 22a are exposed outside. Accordingly, after combining the first member 12 and the second member 13, it is possible to carry out the adhesion at the combined portions respectively between the positioning sections 20a, 22a and the positioning pins 30 As described above, by carrying out the adhesion at the combined portions respectively between the positioning sections 20a, 22a and the positioning pins 30, it is possible to firmly fix the first member 12 and the second member 13 together.

As described above, the assembly of the imaging unit 10 is completed by combining and adhering the first member 12 with the second member 13.

As described above, the assembly of the imaging unit 10 may be carried out such that the shading sheet 59 and the imaging section 60 are attached to the second member 13, and the second biasing blade spring 40, the movable section 49, the yoke 47 to which the drive magnet 48 is mounted, the first biasing blade spring 35, and the first member 12 are assembled to the second member 13 in that order of mention. Accordingly, the assembling work of the imaging unit 10 containing lens unit 10a may be easily performed, thus enabling a reduction work hours.

Figure 16:
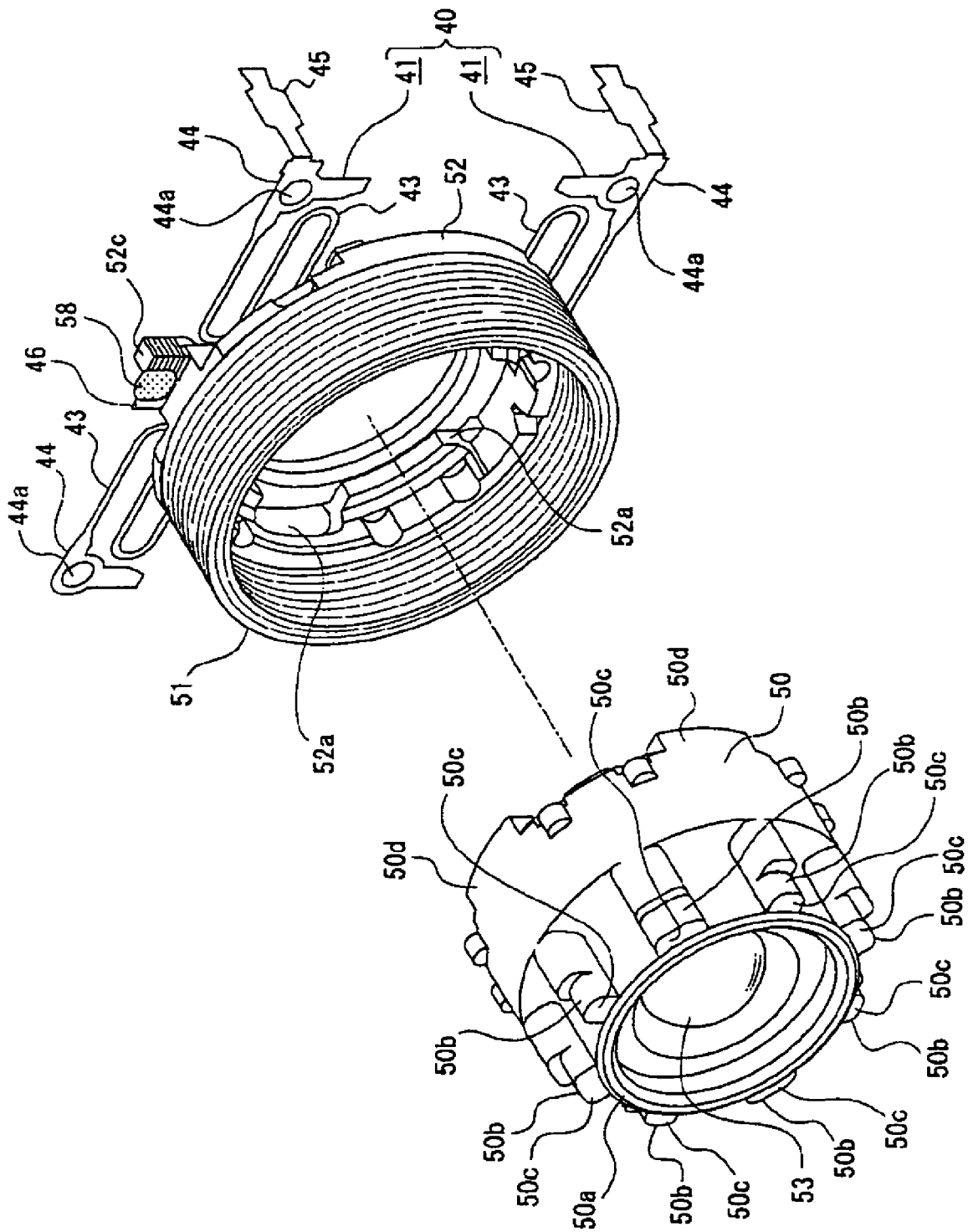
FIG. 16 is an enlarged perspective view in which a movable section and a second biasing blade spring are partially exploded and shown.

In the example described above, the imaging unit 10 is assembled by sequentially attaching the second biasing blade spring 40 and the movable section 49 to the second member 13. Alternatively, it is also possible to assemble the second biasing blade spring 40 and the movable section 49 as follows (see FIG. 16).

First, the driving coil 51 is attached to the coil holder 52, and the holding sections 42 of the second biasing blade spring 40 are attached to the positioning ring section 52b of the coil holder 52. The attachment is carried out by way of adhesion, for example.

Next, both ends of the drive coil 51 are wound around the coil winding projections 52c of the coil holder 52, respectively. Both ends of the drive coil 51 wound around these coil winding projections 52c are respectively connected to the coil connecting portions 46 of the second biasing blade spring 40 by means of the solder 58.

Subsequently, the lens holder 50 to which the lens block 53 is attached is mounted to the coil holder 52 by way of adhesion, etc.

By assembling the second biasing blade spring 40 to the movable section 49 in the above procedure, it is possible to carry out the process of soldering and the process of attaching the lens holder 50 to the coil holder 52 separately. Accordingly, it is possible to remove the need for using a soldering iron in the process of attaching the lens holder 50, thereby preventing the lens block 53 from clouding due to steam generated when the soldering iron is used, or the movable lens from being deformed due to the heat when the soldering iron is used.

Figure 17:
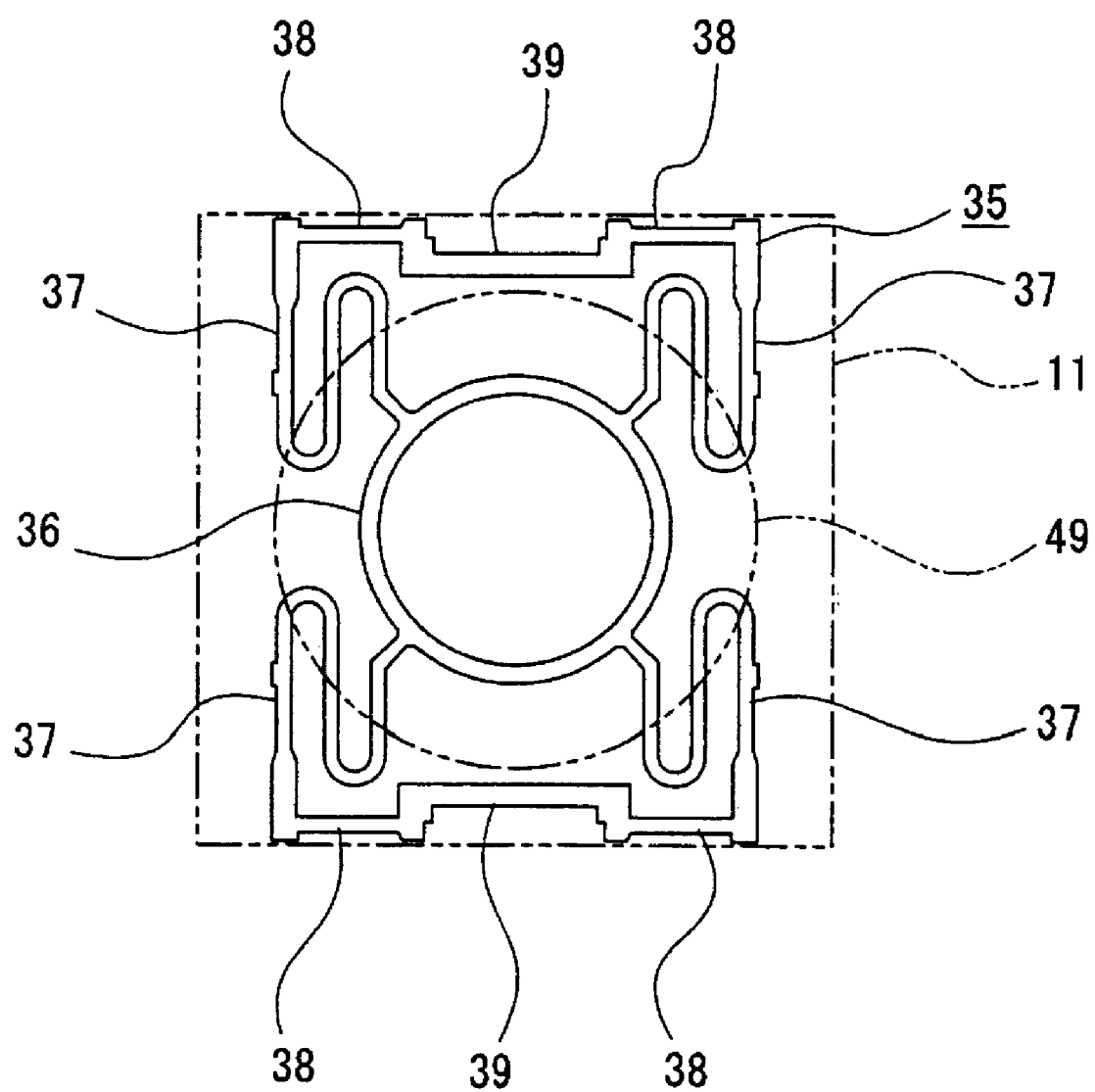
FIG. 17 is a schematic view showing a spatial relationship of a spring section of a first biasing blade spring to a lens barrel and a movable section.
Figure 18:
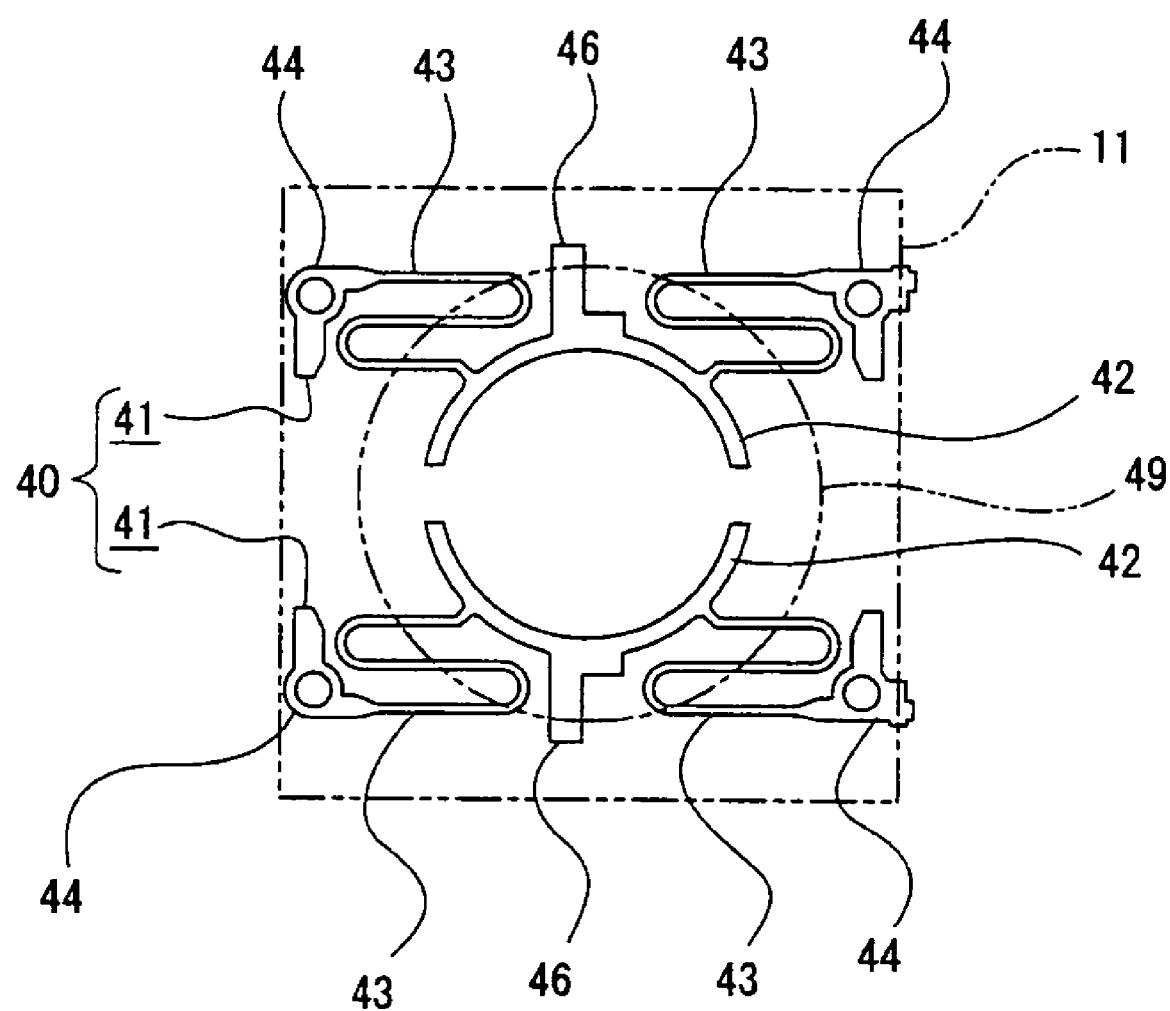
FIG. 18 is a schematic view showing a spatial relationship of a spring section of a second biasing blade spring to a lens barrel and a movable section.

In the imaging unit 10 thus assembled, the lens barrel 11 has a substantially rectangular shape and the movable section 49 has a substantially circular shape when viewed along the optical axis direction (see FIGS. 17 and 18). In this situation, the spring portions 37 of the first biasing blade spring 35 and the spring portions 43 of the second biasing blade spring 40, are located at the four corners within the lens barrel 11.

Accordingly, the spring portions 37 and 43 need the minimum arrangement space, thus enabling the achievement of a reduction in size of the imaging unit 10 including the lens unit 10a.

In the imaging unit 10 thus assembled, the spring force of the first biasing blade spring 35 is larger than the spring force of the second biasing blade spring 40, as described above. Accordingly, when the linear actuator 65 is not in operation where the drive coil 51 is not supplied with the current, the movable section 49 is biased by way of a biasing force of the first biasing blade spring 35 toward the imaging section 60 side (back) in the optical axis direction, and the coil holder 52 is brought into contact with the pedestals 29a of the second member 13, and is held at the infinite point when focusing, as shown in FIG. 6. In this infinite point, the first biasing blade spring 35 is arranged such that the holding portion 36 is located in front of the attachment portions 38, and the second biasing blade spring 40 is arranged such that the holding portions 42 are located behind the attachment portions 44

It should be noted that, in order to eliminate the influences of a pixel pitch or the sensitivity of a lens and locate the movable section 49 at the infinite point, the imaging section 60 may be adjusted by moving it in a forward/rearward direction with respect to the second member 13 while the coil holder 52 is in contact with the pedestals 29a of the second member 13.

Generally, it is often the case that a user of the imaging apparatus 1 uses the apparatus 1 in a situation where the movable section 49 is at the infinite point rather than the macro end. Accordingly, as mentioned above, by always holding the movable section 49 in the infinite point by way of the biasing force of the first biasing blade spring 35 when the linear actuator 65 is not in operation, no electric power is necessary to reach the infinite point, i.e. the frequently-used state, thus reducing electric power consumption to a minimum.

If it is assumed that the movable section is held more at the macro end than the infinite point, the spring force of the second biasing blade spring 40 may be made greater than the spring force of the first biasing blade spring 35. According to this configuration, the movable section 49 may be always held at the macro end by way of the biasing force of the second biasing blade spring 40 when the linear actuator 65 is not in operation, thereby enabling a reduction in electric power consumption at which the user uses more often.

An example of use at the macro end of the imaging apparatus 1 may be a case when reading information on various displays for identifying a one-dimensional bar code, two-dimensional bar codes 1000 and 2000 as shown in FIG. 2, etc.

When using the imaging apparatus 1 as a portable device, an orientation change may arise in the movable section 49, depending on the direction in which the imaging apparatus 1 is held. However, as for the infinite point which may be more frequently used as mentioned above, since the movable section 49 is pushed and held against the second member 13 by way of the biasing force of the first biasing blade spring 35, the orientation change in the movable section 49 is unlikely to take place, thus improving the quality of image.

In order to drive the linear actuator 65, the current is supplied to the drive coil 51. This supplying of the current is carried out through the control circuit board 62 of the imaging section 60 and the second biasing blade spring 40. In one example, the second biasing blade spring 40 may also serve as a current supplying means in addition to the role of biasing the movable section 49. Accordingly, no dedicated means is required in the lens unit 10*a* in order to supply the current to the drive coil 51, thus enabling a reduction the number of components.

Figure 19:
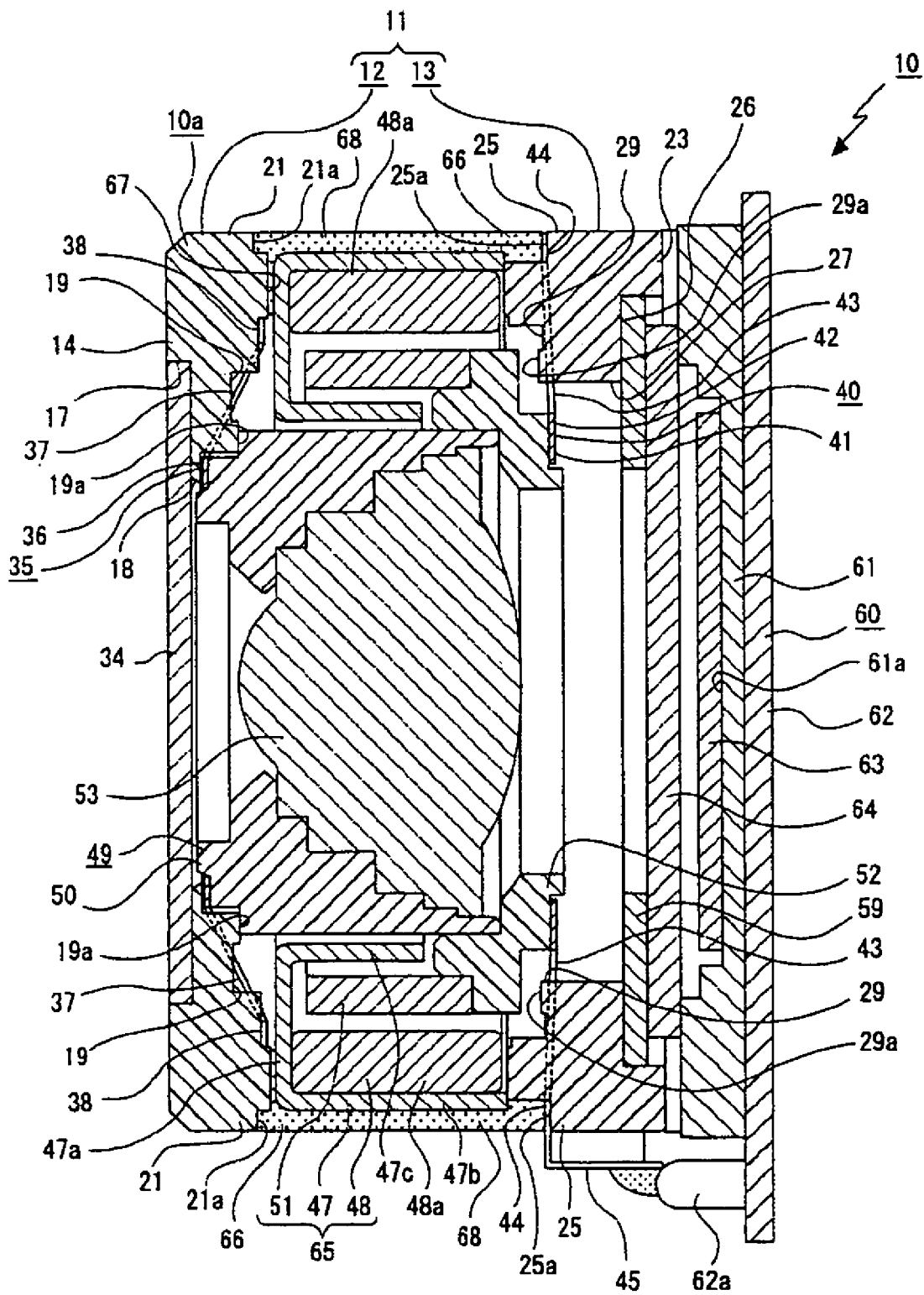
FIG. 19 is a schematic enlarged sectional view showing an imaging unit in a situation where a movable section is held at a macro end.

When current is supplied to the drive coil 51 in a predetermined direction, the linear actuator 65 drives the movable section 49 toward a target object to be imaged (to front side) in the optical axis direction, to a position corresponding to a magnitude of voltage (see FIG. 19). The movable section 49 may be moved up to the macro end where the lens holder 50 is brought into contact with the pedestals 19*a* of the first member 12. In this macro end, the first biasing blade spring 35 is arranged that the holding portion 36 is located in front of the attachment portions 38, and the second biasing blade spring 40 is arranged that the holding portions 42 are located behind the attachment portions 44. However, the amounts of deformation of the spring portions 37, 43 change as the movable section 49 moves forward. The positions (in the optical axis direction) between the holding portion 36 and the attachment portions 38 are spaced apart further, compared with those in the infinite point, and the respective positions (in the optical axis direction) between the holding portions 42 and the attachment portions 44 are brought closer together compared with those in the infinite point.

When the current supply to the drive coil 51 is turned off, the movable section 49 is moved rearward by way of the biasing force of the first biasing blade spring 35.

In the imaging apparatus 1 as mentioned above, by supplying the current to the drive coil 51, the movable section 49 is moved toward the target object side (forward) in the optical axis direction, and by stopping the current supply to the drive coil 51, the movable section 49 is moved toward the imaging section 60 side (rearward) in the optical axis direction. Accordingly, the current supply to the drive coil 51 may be only in one direction, making it easy to control and enabling a saving in power consumption during the focusing operation.

In addition, the example is shown above in which the first biasing blade spring 35 and the second biasing blade spring 40 which are formed of the same material, are made different in thickness so that the spring force of the first biasing blade spring 35 is greater than the spring force of the second biasing blade spring 40. However, the method of making the spring force of the first biasing blade spring 35 larger than the spring force of the second biasing blade spring 40 is not limited to such a method in which both springs are formed with the same material but different in thickness. Alternatively, various types of methods may be used, such as changing the materials used to form springs, changing the form and width of spring portions, etc.

As described above, in the lens unit 10*a*, the movable section 49 is held by the first biasing blade spring 35 and the second biasing blade spring 40. A movement force produced at the movable section 49 in the plane orthogonal to the optical axis is restrained by the line portions 37*b* and the curve sections 37*c* of the spring portions 37 of the first biasing blade spring 35 and is also restrained by the line portion 43*b* and the curve sections 43*c* of the spring portions 43 of the second biasing blade spring 40, whereby the movable section 49 may be moved in the optical axis direction without causing an inclination or shift with respect to the optical axis.

Further, since the lens unit 10*a* of the embodiments does not require guide means, such as a guide shaft for moving the movable section 49 in the optical axis direction, it is possible to simplify its mechanism and to achieve a reduction in size by reducing the space required for arrangement.

Furthermore, since the first biasing blade spring 35 and the second biasing blade spring 40 are located on opposite sides of the movable section 49, apart from each other in the optical axis direction. In other words, the movable section 49 is in between the biasing blade springs. Furthermore, the movable section 49 is moved while being biased rearward by the first biasing blade spring 35 and biased forward by the second biasing blade spring 40. Accordingly, the movable section 49 may be moved to and held at a new position with a high position of accuracy.

Still further, since the spring portions 37, 43 of the first biasing blade spring 35 and the second biasing blade spring 40 are formed into a shape substantially equal to the letter "S", respectively having the line portions 37*b*, 43*b* and the curve portions 37*c*, 43*c*, the spring portions 37, 43 may be increased in length within a small space. Accordingly, it is possible to ensure a sufficient amount of deformation in the spring portions 37, 43 for a movement stroke of the movable section 49 while ensuring a reduction in size of the imaging unit 10 including the lens unit 10*a*.

Furthermore, in the lens unit 10*a*, the first biasing blade spring 35 is configured that the line portions 37*b* of the spring portions 37 extend vertically, and the second biasing blade spring 40 are configured to be rotated about the optical axis by 90 degrees with respect to the first biasing blade spring 35 that the line portions 43*b* of the spring portions 43 extend in the horizontal direction. Accordingly, the movement force produced at the movable section 49 in the plane orthogonal to the optical axis may be restrained efficiently.

Next, relationships between gravity produced in the movable section 49 and the spring force of the first biasing blade spring 35, etc. will be described (see FIG. 20).

As described above, since the imaging apparatus 1 may be used also as a portable device, its orientation may change depending on the condition of use.

For example, as the optical axis direction is brought into agreement with the perpendicular direction (vertical direction), the first biasing blade spring 35 having a strong spring force may be located below and the second biasing blade spring 40 having a weak spring force may be located above.

Figure 20:
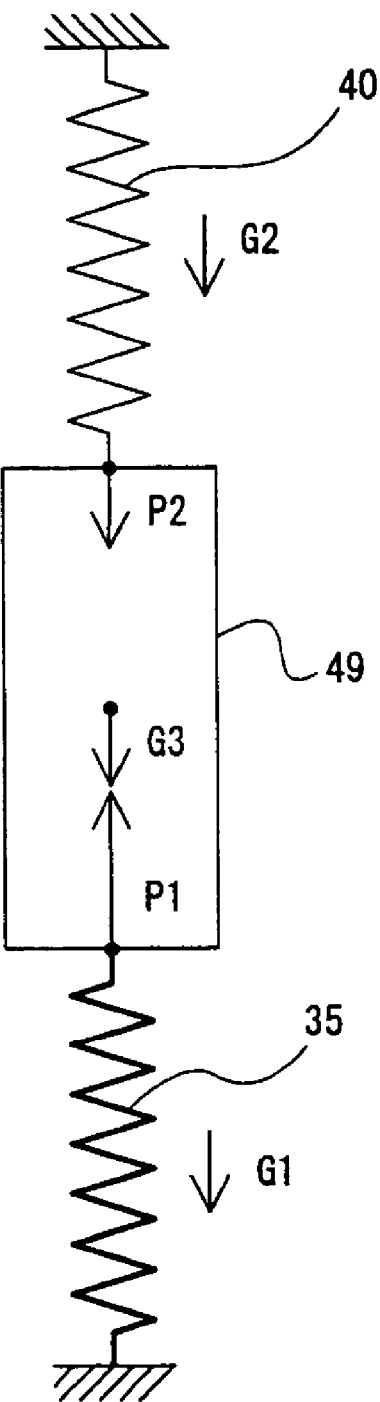
FIG. 20 is a schematic representation showing force generated at each portion where an optical axis direction is in agreement with the perpendicular direction.

As shown in FIG. 20, also in this state, the movable section 49 is biased by a biasing force P1 of the first biasing blade spring 35 toward the second biasing blade spring 40 side (upward), and the movable section 49 is biased by a biasing force P2 of the second biasing blade spring 40 toward the first biasing blade spring 35 side (downward). However, in the first biasing blade spring 35, the second biasing blade spring 40, and the movable section 49, perpendicular and downward gravities G1, G2, and G3 are respectively produced, which are in agreement with the optical axis direction.

In such a situation, in the imaging apparatus 1, an upward biasing force Ps obtained by subtracting the biasing force P2 of the second biasing blade spring 40 from the biasing force P1 of the first biasing blade spring 35, is set that it is larger than the total of gravities Gt (=G1+G2+G3). Accordingly, even if the drive coil 51 is not supplied with the current, the movable section 49 may be held reliably in the infinite point regardless of the use condition of the imaging apparatus 1 since the movable section 49 is always pushed against the moving edge on the imaging section 60 side by means of the first biasing blade spring 35 irrespective of the orientation at which the imaging apparatus 1 is used.

In addition, as the movable section 49 moves in the optical axis direction, the biasing force Ps obtained by subtracting the biasing force P2 of the second biasing blade spring 40 from the biasing force P1 of the first biasing blade spring 35 changes with the amount of deformation of the spring portions 37 of the first biasing blade spring 35 and the spring portions 43 of the second biasing blade spring 40. The biasing force Ps may be set to, for example, twice the total of gravity Gt when the movable section 49 is at the infinite point, t. The biasing force Ps may be set to, for example, 5 times through 10 times the total of gravity Gt when the movable section 49 is located at the macro end.

Below, modifications of the biasing blade spring will be described (see FIGS. 21 through 26). It should be noted that the first modification and the second modification are each shown schematically in FIGS. 21 and 22.

Figure 21:
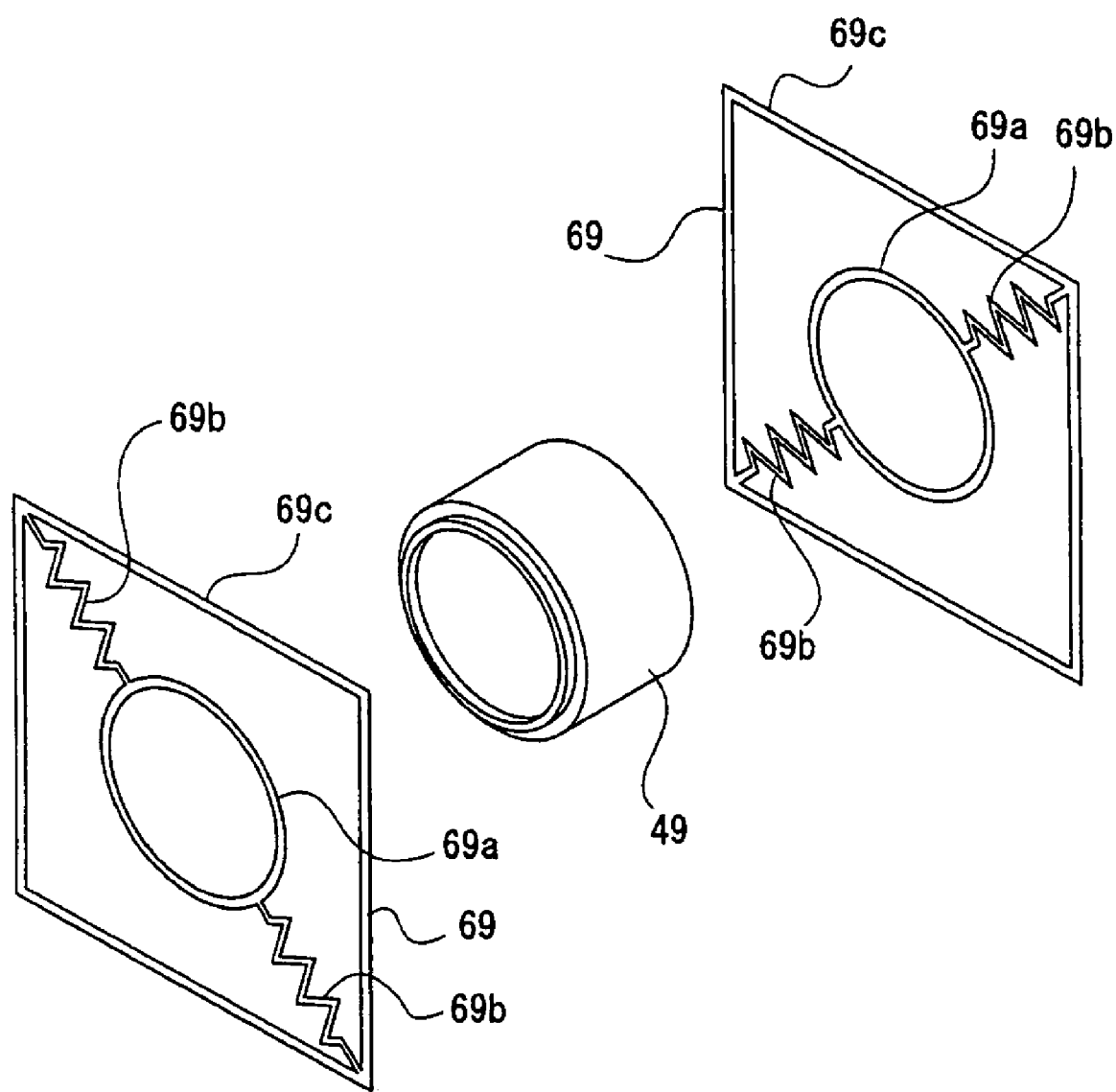
FIG. 21 shows a modification of a biasing blade spring in conjunction with FIG. 22 through FIG. 26, and is a schematic perspective view showing a biasing blade spring in accordance with a first modification together with a movable section.

As shown in FIG. 21, each of biasing blade springs 69 in accordance with the first modification has a holding portion 69a, spring portions 69b and an attachment portion 69c. The spring portions 69b are located diagonally with respect to the holding portions 69a. Positions of the spring portions 69b of one biasing blade spring 69 are respectively rotationally spaced apart by 90 degrees from positions of the spring portions 69b of the other biasing blade spring 69 in a direction of rotation about the optical axis.

With a simple structure in which the biasing blade springs 69 as mentioned above are used, the movable section 49 may be moved in the optical axis direction, without causing the movable section 49 to incline or shift with respect to the optical axis.

Figure 22:
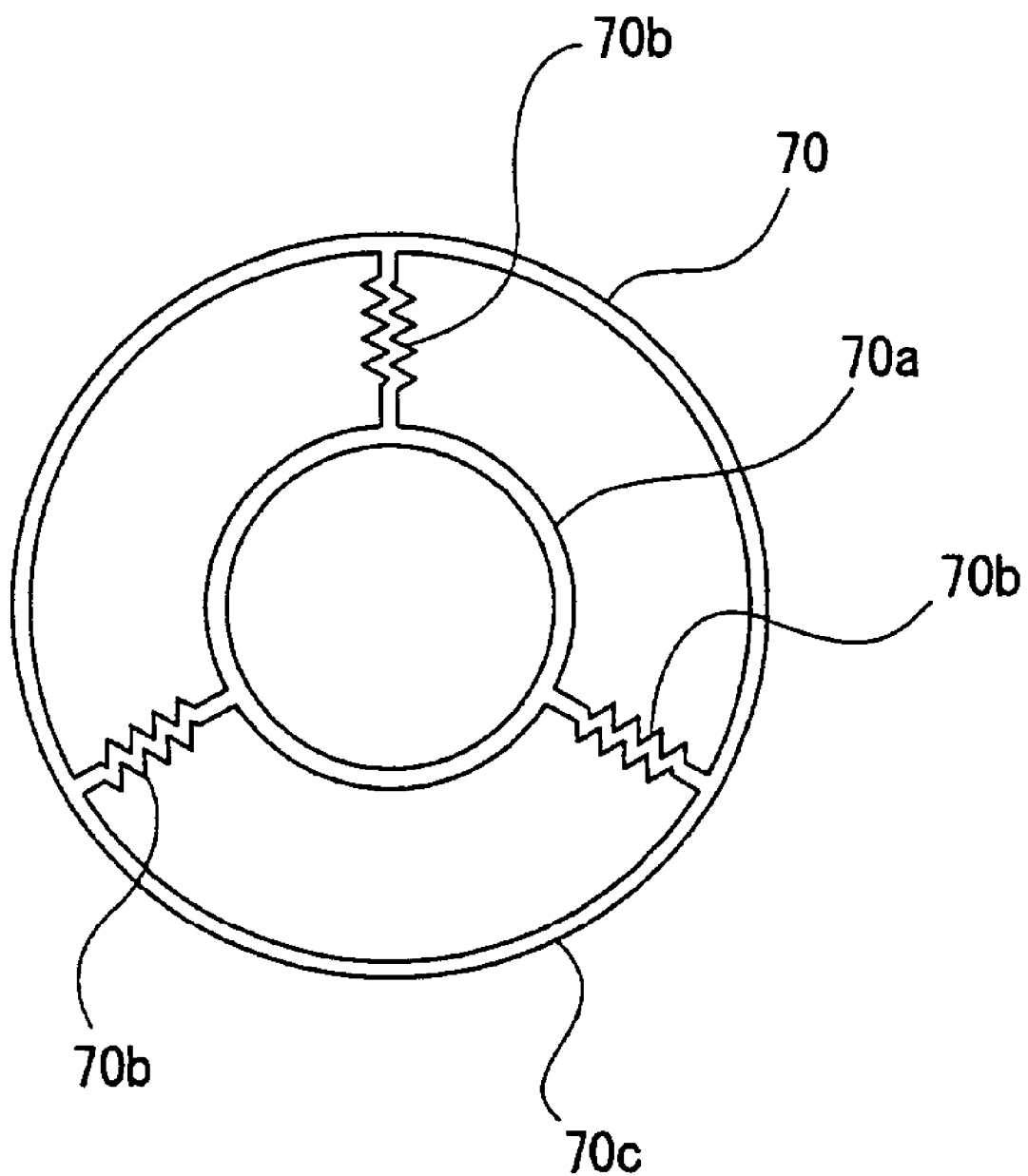
FIG. 22 is an enlarged front view showing a biasing blade spring in accordance with a second modification.

As shown in FIG. 22, the biasing blade spring 70 in accordance with the second modification has a holding portion 70a, spring portions 70b and an attachment portion 70c. The spring portions 70b are connected to the holding portion 70a at the same interval in the direction of rotation about the optical axis.

By using the biasing blade spring 70 as mentioned above, the movable section 49 may be moved in the optical axis direction, without causing the movable section 49 to incline or shift with respect to the optical axis with a simple structure.

Figure 23:
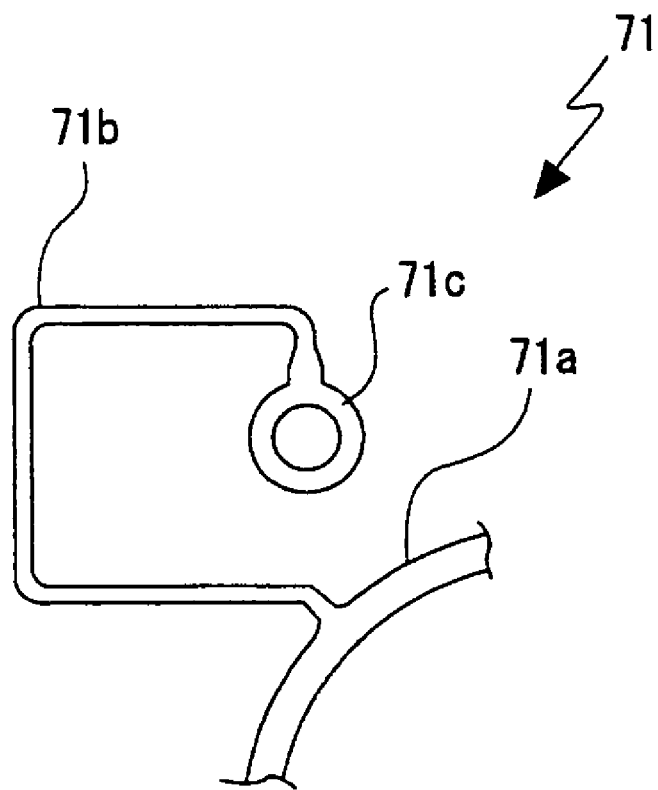
FIG. 23 is an enlarged front view showing a part of a biasing blade springs in accordance with a third modification.

As shown in FIG. 23, a biasing blade spring 71 in accordance with the third modification has a holding portion 71a, a spring portion 71b and an attachment portion 71c, and the spring portion 71b is formed substantially in the shape of a rectangle.

Figure 24:
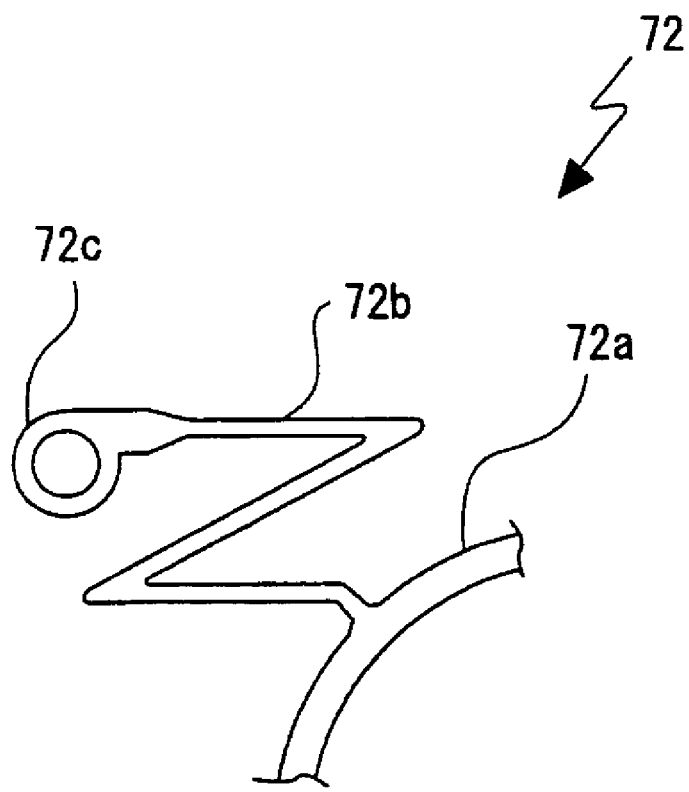
FIG. 24 is an enlarged front view showing a part of a biasing blade spring in accordance with a fourth modification.

As shown in FIG. 24, a biasing blade spring 72 in accordance with the fourth modification has a holding portion 72a, a spring portion 72b and an attachment portion 72c, and the spring portion 72b is formed into a form substantially equal to the letter "Z".

Figure 25:
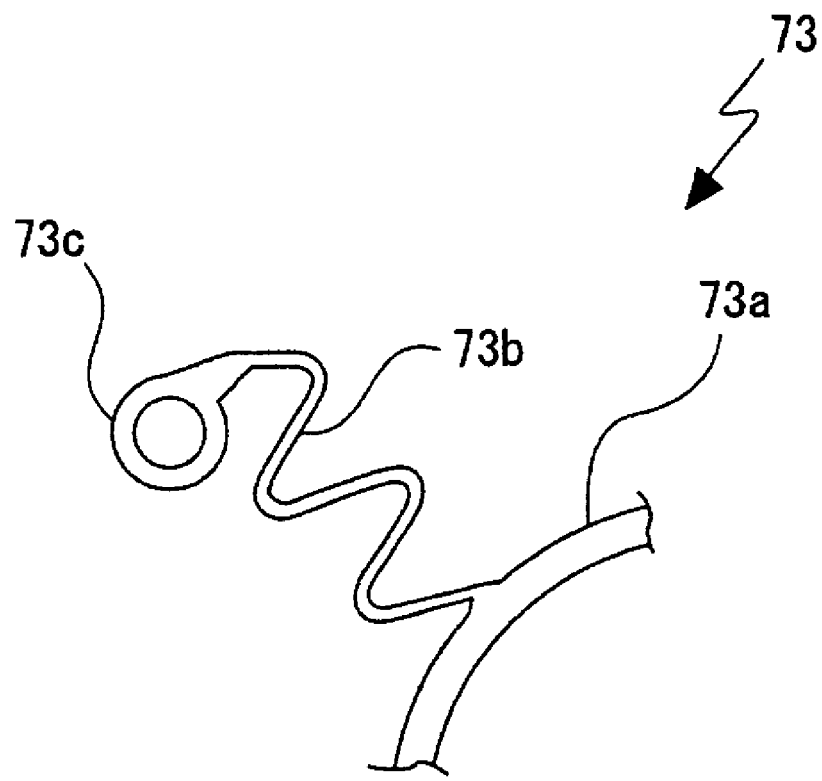
FIG. 25 is an enlarged front view showing a part of a biasing blade spring in accordance with a fifth modification.

As shown in FIG. 25, a biasing blade spring 73 in accordance with the fifth modification has a holding portion 73a, a spring portion 73b and an attachment portion 73c, and the spring portion 73b is formed into a form substantially equal to the letter "W".

Figure 26:
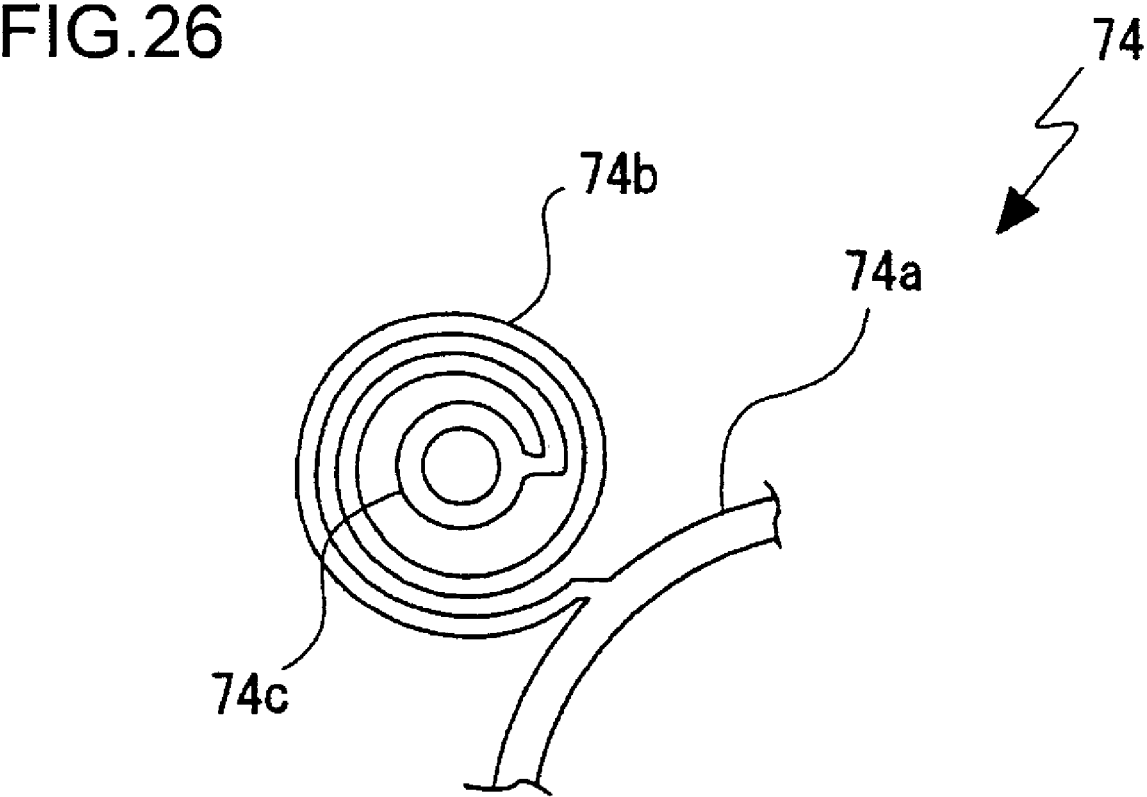
FIG. 26 is an enlarged front view showing a part of a biasing blade spring in accordance with a sixth modification.

As shown in FIG. 26, a biasing blade spring 74 in accordance with the sixth modification has a holding portion 74a, a spring portion 74b and an attachment portion 74c, and the spring portion 74b is formed spirally.

By using the biasing blade springs 71, 72, 73, and 74 as mentioned above, the movable section 49 may be moved in the optical axis direction, without causing the movable section 49 to incline or shift with respect to the optical axis with a simple structure.

Furthermore, especially in the biasing blade spring 73 in accordance with the fifth modification and the biasing blade spring 74 in accordance with the sixth modification, lengths of the spring portions 73b and 74b may be lengthened within small spaces, thus achieving a reduction in size of the imaging unit 10 including the lens unit 10a and an increase in the amounts of deformation of the spring portions 73b and 74b.

It should be noted that in the biasing blade springs 69 in accordance with the first above-mentioned modification and the biasing blade spring 70 in accordance with the second modification, the spring portions 69b, 70b are schematically shown in FIGS. 21 and 22. However, shapes of the spring portions 69b, 70b may have a form substantially equal to the letter "S", like the first biasing blade spring 35 and the second biasing blade spring 40. Further, it is possible to use any of a rectangle, a letter "Z", a letter "W", a spiral shape and any form substantially similar to any of the previous forms or shapes, as in the biasing blade spring 71 in accordance with the third modification through the biasing blade spring 74 in accordance with the sixth modification.

Further, the above-mentioned shapes of respective spring portions are merely examples, and their shapes are not limited thereto, and a spring portion of any shape may be employed, provided it acts as a blade spring and has a shape allowing biasing force against the movable section 49.

Although examples are shown above in which the lens unit 10a employs a focal drive, the lens unit 10a may also employ a zooming drive.

Figure 27:
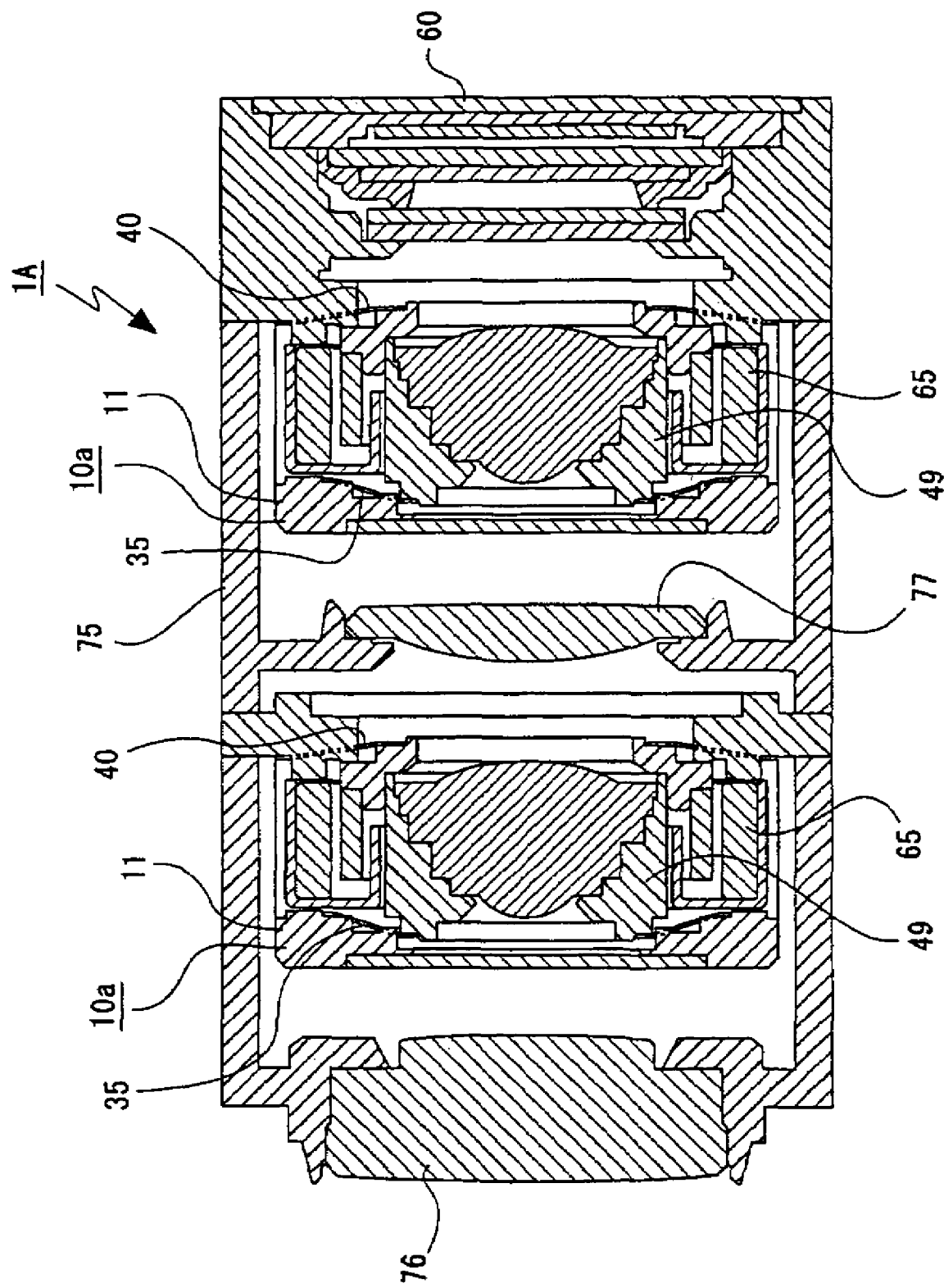
FIG. 27 is an enlarged sectional view showing an example of an imaging apparatus in which two lens units are provided.

Further, as shown in FIG. 27, the embodiments of the present invention may also be used for an imaging apparatus 1A which performs focal drive and zooming drive. An example of such an imaging apparatus 1A will be described in the following:

The imaging apparatus 1A has the lens units 10a provided within an outer lens barrel 75. The lens unit 10a disposed at the front side is for zooming, and the lens unit 10a disposed at the rear side is for focusing. The imaging section 60 is provided at the rear end of the outer lens barrel 75.

A first lens 76 is mounted to the front end of the outer lens barrel 75 as a first lens group, and a second lens 77 is mounted inside the outer lens barrel 75 as a third lens group. The second lens 77 is disposed between the lens units 10a. Accordingly, each movable lens of the movable section 49 of the lens unit 10a on the front side functions as a second lens group, and each movable lens of the movable section 49 of the lens unit 10a on the rear side functions as a fourth lens group.

In such an imaging apparatus 1A, by driving the linear actuator 65 of the lens unit 10a to the front side, the movable section 49 is moved in the optical axis direction while being held with the first biasing blade spring 35 and the second biasing blade spring 40, thereby carrying out a zooming operation. By driving the linear actuator 65 of the lens unit 10a to the rear side, the movable section 49 is moved in the optical axis direction while being held with the first biasing blade spring 35 and the second biasing blade spring 40, thereby carrying out a focusing operation.

The imaging apparatus 1A does not require guide means, such as a guide shaft. Accordingly, the mechanism of the imaging apparatus 1A may be simplified and the arrangement space therein may be reduced, to thereby achieve a reduction in size. Further, since the respective movable sections 49 are held with the first biasing blade springs 35 and the second biasing blade springs 40, the movable sections 49 may be moved in the optical axis direction, without causing the movable sections 49 to incline or shift with respect to the optical axis.

It should be noted that the vertical, forward/rearward directions as shown above are used for convenience of description, but not exclusively.

In the embodiment described above, the positioning hole is formed in the attachment portion of the spring member, and the lens barrel is provided with a positioning pin which is inserted into the positioning hole of the spring member so as to position the spring member with respect to the lens barrel. Accordingly, it is possible to improve an accuracy of positioning of the two spring members when they are attached to the lens barrel.

In the embodiment described above, the two spring members are arranged symmetrically about the optical axis. Accordingly, the movable section may be biased in the optical axis direction while ensuring good balance when the movable section moves in the optical axis direction.

In the embodiment described above, the lens unit comprises the coil holder to which the drive coil and the two spring members are attached; and the lens holder in which the movable lens is mounted and held wherein the lens holder in which the movable lens is mounted is attached to the coil holder, the drive coil and the two spring members being attached to the coil holder, both ends of the drive coil and the coil connecting portions are respectively connected by solder. Accordingly, it is possible to carry out separately the process of soldering both ends of the drive coil to the coil connecting portion and the process of attaching the lens holder to the coil holder, thereby eliminating the need for using a soldering iron in the processing of attaching the lens holder. Since the soldering iron is not used in the embodiments of the present invention, no clouding or deformation occurs on the movable lens due to steam or heat generated in case the soldering iron is in use.

In addition to the advantages described above, the following advantages may be obtained by specific features of the embodiments described above.

In the embodiments of the present invention, the movable section may be moved by way of the drive power of the linear actuator in the optical axis direction while the movable section is held by the biasing blade springs. Accordingly, the movable section may be moved in the optical axis direction without causing the movable section to incline or deviate with respect to the optical axis.

In the embodiments of the present invention, any guiding means, such as a guide shaft for guiding the movable section in the optical axis direction, is not required. Accordingly, it is possible to achieve a reduction in size by simplifying the mechanism of the lens unit and eliminating the space for such guiding means.

In the embodiment described above, the movable section is formed to have a substantially circular outer shape when viewed along the optical axis direction, the lens barrel is formed to have a substantially rectangular outer shape when viewed along the optical axis direction, and each of spring portions of the biasing blade spring is located at a respective one of four corners in the lens barrel. Accordingly, the spring portions only require the minimum arrangement space, and the lens unit may be miniaturized.

In the embodiment described above, each spring portion of the biasing blade spring is formed into a form substantially equal to the letter "S". Accordingly, a larger length of the spring portion may be secured within a small space, thus achieving a reduction of size of the lens unit while ensuring a sufficient amount of deformation of the spring portion for a movement stroke of the movable section.

In the embodiment described above, a pair of the biasing blade springs is provided on opposite sides of the movable section in the optical axis direction and spaced apart such that the movable section is placed between the biasing blade springs, and the pair of biasing blade springs is arranged so as to bias the movable section in such a way that the pair of biasing blade springs approaches each other in the optical axis direction. Accordingly, the movable section may be held at a new position after movement with high position accuracy.

In the embodiment described above, the spring portions of the pair of biasing blade springs are provided with line portions respectively extending in predetermined directions, and the pair of biasing blade springs is configured such that the line portion of one biasing blade spring and the line portion of the other biasing blade spring are perpendicular to each other. Accordingly, any force produced at the movable section in the plane perpendicular to the optical axis may be restrained efficiently.

In the embodiment described above, the movable section is used as a movable section for focusing, the pair of biasing blade springs are configured to have different spring forces against the movable section, and the movable section is positioned at the infinite point by way of the biasing force of the biasing blade spring when the linear actuator is not in operation. Accordingly, it is possible to bring the lens unit to a frequently-used status (the infinite position) without consuming any electric power, thereby reducing power consumption to a minimum.

The present invention claims priority to its priority documents 2005-037972 and 2005-065933 filed in the Japanese Patent Office on Feb. 15, 2005 and Mar. 9, 2005, respectively, the entire contents of which are incorporated by reference herein.

The particular shapes and structures of each portion as shown in the above-mentioned embodiments are merely examples of the embodiment performed when implementing the present invention, and the technical scope of the present invention is not construed exclusively by them.

What is claimed is:

1. A lens unit comprising:

a lens barrel in which an imaging optical system is disposed;

a movable section including a movable lens and configured to be moved in an optical axis direction relative to the lens barrel;

a linear actuator including a drive magnet and a drive coil and configured to move the movable section in the optical axis direction by supplying a current to the drive coil; and a first and second biasing blade springs including holding portions for holding the movable section, a plurality of spring portions capable of being elastically deformed and biasing the movable section in the optical axis direction, and attachment portions to be attached to the lens barrel;

wherein the second biasing blade springs is formed with two spring members;

wherein a thickness of the second biasing blade spring is thinner than a thickness of the first biasing blade spring such that the spring force of the first biasing blade spring is larger than a spring force of the second biasing blade spring; and wherein the current is supplied to the drive coil via the two spring members.

2. The lens unit according to claim 1, wherein:
the two spring members are respectively provided with coil connecting portions to be connected to both ends of the drive coil, and connecting terminal portions for supplying a current to the drive coil.

3. The lens unit according to claim 1, wherein:
a positioning hole is formed in an attachment portion of the spring member; and
the lens barrel is provided with a positioning pin to be inserted into the positioning hole of the spring member so as to position the spring member with respect to the lens barrel.

4. The lens unit according to claim 1, wherein:
the two spring members are arranged symmetrically about the optical axis.

5. The lens unit according to claim 2, further comprising:
a coil holder to which the drive coil and the two spring members are attached; and
a lens holder in which the movable lens is mounted and held;
wherein the lens holder in which the movable lens is mounted is attached to the coil holder, the drive coil and the two spring members being attached to the coil holder, both ends of the drive coil and the coil connecting portions are respectively connected by solder.

6. The lens unit according to claim 1, wherein:
the plurality of spring portions of the first and second biasing blade springs are configured to restraint a movement force produced at the movable section in a plane orthogonal to the optical axis.

7. The lens unit according to claim 1, wherein:
the movable section is formed to have a substantially circular outer shape when viewed along the optical axis direction;
the lens barrel is formed to have a substantially rectangular outer shape when viewed along the optical axis direction; and
each of the spring portions of the first and second-biasing blade springs is disposed at a respective one of four corners in the lens barrel.

8. The lens unit according to claim 1, wherein:
each of the spring portions is formed into a form substantially equal to a letter "S".

9. The lens unit according to claim 1, wherein:
a first and second of biasing blade springs are provided to be on opposite sides of the movable section in the optical axis direction and spaced apart such that the movable section is positioned between the first and second of biasing blade springs, the first and second of biasing blade springs forcing the movable section such that the first and second of biasing blade springs approach to each other in the optical axis direction.

10. The lens unit according to claim 9, wherein:
the spring portions of the first and second of biasing blade springs are provided with line portions respectively extending in predetermined directions; and
the first and second of biasing blade springs are configured such that the line portion of one biasing blade spring and the line portion of the other biasing blade spring are perpendicular to each other.

11. The lens unit according to claim 9, wherein:
the movable section is used as a movable section for focusing,
the first and second of biasing blade springs are configured to have different spring forces against the movable section; and
the movable section is positioned at an infinite point by way of a biasing force of the first and second biasing blade springs if the linear actuator is not in operation.

12. An imaging apparatus having an imager device and a lens unit in which an imaging optical system is provided in a lens barrel,
the lens unit comprising:
a movable section including a movable lens and configured to be moved in an optical axis direction relative to the lens barrel;
a linear actuator including a drive magnet and a drive coil and configured to move the movable section in the optical axis direction by supplying a current to the drive coil; and
a first and second biasing blade springs including holding portions for holding the movable section, a plurality of spring portions capable of being elastically deformed and biasing the movable section in the optical axis direction, and attachment portions to be attached to the lens barrel;
wherein the second biasing blade springs is formed with two spring members;
wherein a thickness of the second biasing blade spring is thinner than a thickness of the first biasing blade spring such that the spring force of the first biasing blade spring is larger than a spring force of the second biasing blade spring; and
wherein the current is supplied to the drive coil via the two spring members.

13. The imaging apparatus according to claim 12, wherein:
the two spring members are respectively provided with coil connecting portions to be connected to both ends of the drive coil, and connecting terminal portions for supplying a current to the drive coil.

14. The imaging apparatus according to claim 12, wherein:
a positioning hole is formed in an attachment portion of the spring member; and
the lens barrel is provided with a positioning pin to be inserted into the positioning hole of the spring member so as to position the spring member with respect to the lens barrel.

15. The imaging apparatus according to claim 12, wherein:
the two spring members are arranged symmetrically about the optical axis.

16. The imaging apparatus according to claim 13, wherein:
a coil holder to which the drive coil and the two spring members are attached; and
a lens holder in which the movable lens is mounted and held;
wherein the lens holder in which the movable lens is mounted is attached to the coil holder, the drive coil and the two spring members being attached to the coil holder, both ends of the drive coil and the coil connecting portions are respectively connected by solder.

17. The imaging apparatus according to claim 12, wherein:
the plurality of spring portions of the first and second biasing blade springs are configured to restraint a movement force produced at the movable section in a plane orthogonal to the optical axis.

18. The imaging apparatus according to claim 12, wherein:
the movable section is formed to have a substantially circular outer shape when viewed along the optical axis direction;
the lens barrel is formed to have a substantially rectangular outer shape when viewed along the optical axis direction; and each of spring portions of the first and second biasing blade springs is located at a respective one of four corners in the lens barrel.

19. The imaging apparatus according to claim 12, wherein:
each of the spring portions of the first and second biasing blade springs is formed into a form substantially equal to a letter "S".

20. The imaging apparatus according to claim 12, wherein:
a first and second of biasing blade springs are provided to be on opposite sides of the movable section in the optical axis direction and spaced apart such that the movable section is positioned between the first and second of biasing blade springs, the first and second of biasing blade springs forcing the movable section such that the first and second of biasing blade springs approach to each other in the optical axis direction.

21. The imaging apparatus according to claim 20, wherein:
the spring portions of the first and second of biasing blade springs are provided with line portions respectively extending in predetermined directions; and
the first and second of biasing blade springs are configured such that the line portion of one biasing blade spring and the line portion of the other biasing blade spring are perpendicular to each other.

22. The imaging apparatus according to claim 20, wherein:
the movable section is used as a movable section for focusing,
the first and second of biasing blade springs are configured to have different spring forces against the movable section; and
the movable section is positioned at an infinite point by way of a biasing force of the first and second biasing blade springs if the linear actuator is not in operation.

23. The lens unit according to claim 1, wherein the holding portions is formed in a ring shape.

24. The imaging apparatus according to claim 12, wherein the holding portions is formed in a ring shape.

25. The lens unit according to claim 5, wherein:
the lens holder is provided with holding ribs in a position closer to the front end of a perimeter of the lens holder at regularly shaped intervals, and
the coil holder is provided with projections for coli winding, which are projected upward and downward.

26. The imaging apparatus according to claim 16, wherein:
the lens holder is provided with holding ribs in a position closer to the front end of a perimeter of the lens holder at regularly shaped intervals, and
the coil holder is provided with projections for coli winding, which are projected upward and downward.

27. The lens unit according to claim 25, wherein:
the holding portion of the first biasing spring is abutted to the contact surfaces of the holding ribs.

28. The lens unit according to claim 26, wherein:
the holding portion of the first biasing spring is abutted to the contact surfaces of the holding ribs.

* * * * *